US006044205A

United States Patent [19]
Reed et al.

[11] Patent Number: 6,044,205
[45] Date of Patent: *Mar. 28, 2000

[54] COMMUNICATIONS SYSTEM FOR TRANSFERRING INFORMATION BETWEEN MEMORIES ACCORDING TO PROCESSES TRANSFERRED WITH THE INFORMATION

[75] Inventors: Drummond Shattuck Reed; Peter Earnshaw Heyman; Steven Mark Mushero; Kevin Benard Jones; Jeffrey Todd Oberlander; Dan Banay, all of Seattle, Wash.

[73] Assignee: Intermind Corporation, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/609,115

[22] Filed: Feb. 29, 1996

[51] Int. Cl.⁷ ..................................................... G06F 17/30
[52] U.S. Cl. .................................. 395/200.31; 395/200.3; 395/200.33; 395/200.42; 395/200.46; 395/200.59; 707/1; 707/10; 707/102; 707/104
[58] Field of Search ......................... 395/200.01, 200.03, 395/200.05, 200.08, 200.09, 200.13, 200.15, 601, 200.3–200.33, 200.44–200.49, 200.59, 610–615, 200 T; 707/1, 10, 100–104

[56] References Cited

U.S. PATENT DOCUMENTS

| | | | |
|---|---|---|---|
| 4,274,139 | 6/1981 | Hodgkinson et al. | 395/200.33 |
| 4,432,057 | 2/1984 | Daniell et al. | 707/8 |
| 4,558,413 | 12/1985 | Schmidt et al. | 364/300 |
| 4,604,686 | 8/1986 | Reiter et al. | 395/500 |
| 4,714,992 | 12/1987 | Gladney et al. | 707/206 |
| 4,714,995 | 12/1987 | Materna et al. | 707/201 |
| 4,745,559 | 5/1988 | Willis et al. | 705/37 |
| 4,815,030 | 3/1989 | Cross et al. | 707/10 |
| 4,974,149 | 11/1990 | Valenti | 364/200 |
| 5,008,814 | 4/1991 | Mathur | 364/200 |

(List continued on next page.)

FOREIGN PATENT DOCUMENTS

WO 95/33236  12/1995  WIPO.

OTHER PUBLICATIONS

Marvin Sirbn and J.D. Tggar, "Netbill: An Internet Commerce System Optimized for Network–Delivered Services", IEEE Personal Communications Magazine, p. 34–39, Aug. 1995.

Henrik Erikson, "Expert System As Knowledge Servers", IEEE Expert Magazine, p. 14–19, Jun. 1996.

Brdi Yuwono and Dik Lnn Lee, "Wise: A World Wide Web Resource Database System", IEEE Transactions on Knowledge and Data Engineering, vol. 8, No. 4, Aug. 1996.

H. Penny Nii "Blackboard Systems" The Al Magazine, Summer, 1986.

AppleShare, Apr., 1995.

(List continued on next page.)

Primary Examiner—Parshotam S. Lall
Assistant Examiner—Bharat Barot
Attorney, Agent, or Firm—Wolf, Greenfield & Sacks P.C.

[57] ABSTRACT

An automated communications system operates to transfer data, metadata and methods from a provider computer to a consumer computer through a communications network. The transferred information controls the communications relationship, including responses by the consumer computer, updating of information, and processes for future communications. Information which changes in the provider computer is automatically updated in the consumer computer through the communications system in order to maintain continuity of the relationship. Transfer of metadata and methods permits intelligent processing of information by the consumer computer and combined control by the provider and consumer of the types and content of information subsequently transferred. Object oriented processing is used for storage and transfer of information. Method servers provide specialized data, metadata, and methods to providers and consumers to automate many common communications services and transactions useful to both providers and consumers.

24 Claims, 18 Drawing Sheets

U.S. PATENT DOCUMENTS

| | | | |
|---|---|---|---|
| 5,008,853 | 4/1991 | Bly et al. | 364/900 |
| 5,019,963 | 5/1991 | Alderson et al. | 364/200 |
| 5,133,075 | 7/1992 | Risch | 395/800 |
| 5,155,847 | 10/1992 | Kirouac et al. | 395/600 |
| 5,187,787 | 2/1993 | Skeen et al. | 395/600 |
| 5,220,657 | 6/1993 | Bly et al. | 395/425 |
| 5,226,161 | 7/1993 | Khoyi et al. | 395/650 |
| 5,257,369 | 10/1993 | Skeen et al. | 395/650 |
| 5,287,504 | 2/1994 | Carpenter et al. | 707/201 |
| 5,303,379 | 4/1994 | Khoyi et al. | 395/700 |
| 5,359,730 | 10/1994 | Marron | 395/650 |
| 5,404,488 | 4/1995 | Kerrigan et al. | 711/133 |
| 5,426,747 | 6/1995 | Weinreb et al. | 395/400 |
| 5,440,744 | 8/1995 | Jacobson et al. | 395/650 |
| 5,452,447 | 9/1995 | Nelson et al. | 395/650 |
| 5,473,772 | 12/1995 | Halliwell et al. | 395/712 |
| 5,485,370 | 1/1996 | Moss et al | 395/200.47 |
| 5,491,820 | 2/1996 | Belove et al. | 707/3 |
| 5,495,610 | 2/1996 | Shing et al. | 395/600 |
| 5,497,491 | 3/1996 | Mitchell et al. | 395/700 |
| 5,499,343 | 3/1996 | Pettus | 395/200.2 |
| 5,515,508 | 5/1996 | Pettus et al. | 395/200.01 |
| 5,519,769 | 5/1996 | Weinberger et al. | 379/112 |
| 5,519,875 | 5/1996 | Yokoyama et al. | 395/800 |
| 5,528,490 | 6/1996 | Hill | 364/403 |
| 5,548,726 | 8/1996 | Pettus | 395/200.09 |
| 5,555,427 | 9/1996 | Aoe et al. | 395/800 |
| 5,557,793 | 9/1996 | Koerber | 395/600 |
| 5,560,012 | 9/1996 | Ryu et al. | 395/701 |
| 5,564,051 | 10/1996 | Halliwell et al. | 707/200 |
| 5,566,302 | 10/1996 | Khalidi et al. | 395/200.09 |
| 5,577,244 | 11/1996 | Killebrew et al. | 395/703 |
| 5,581,755 | 12/1996 | Koerber et al. | 395/614 |
| 5,581,761 | 12/1996 | Radia et al. | 395/702 |
| 5,581,764 | 12/1996 | Fitzgerald et al. | 395/703 |
| 5,586,311 | 12/1996 | Davies et al. | 707/1 |
| 5,586,326 | 12/1996 | Ryu et al. | 395/701 |
| 5,596,720 | 1/1997 | Hamuda et al. | 395/200.36 |
| 5,596,746 | 1/1997 | Shen et al. | 707/101 |
| 5,600,834 | 2/1997 | Howard | 395/617 |
| 5,608,874 | 3/1997 | Ogawa et al. | 395/200.15 |
| 5,615,112 | 3/1997 | Sheng et al. | 707/104 |
| 5,619,710 | 4/1997 | Travis, Jr. et al. | 395/200.33 |
| 5,623,656 | 4/1997 | Lyons | 395/200.36 |
| 5,623,661 | 4/1997 | Hon | 707/1 |
| 5,625,818 | 4/1997 | Zarner et al. | 395/615 |
| 5,630,092 | 5/1997 | Carreiro et al. | 395/438 |
| 5,630,116 | 5/1997 | Takeya et al. | 395/617 |
| 5,634,010 | 5/1997 | Ciscon et al. | 395/200.15 |
| 5,640,564 | 6/1997 | Hamilton et al. | 395/683 |
| 5,644,764 | 7/1997 | Johnson et al. | 395/614 |
| 5,649,192 | 7/1997 | Stucky | 395/614 |
| 5,652,887 | 7/1997 | Dewey et al. | 395/683 |
| 5,668,997 | 9/1997 | Lynch-Freshner et al. | 395/683 |
| 5,673,322 | 9/1997 | Pepe et al. | 380/49 |
| 5,682,532 | 10/1997 | Remington et al. | 395/683 |
| 5,684,984 | 11/1997 | Jones et al. | 395/610 |
| 5,684,991 | 11/1997 | Malcolm | 395/620 |
| 5,689,708 | 11/1997 | Regnier et al. | 395/682 |
| 5,694,546 | 12/1997 | Reisman | 395/200.9 |
| 5,706,434 | 1/1998 | Kremen et al. | 395/200.09 |
| 5,710,918 | 1/1998 | Lagarde et al. | 395/610 |
| 5,746,559 | 5/1998 | Nishikawa | 428/142 |

OTHER PUBLICATIONS

"Manual Page for Unix NFS Mount Command" No date.

"Manual Page for Unix FSTAB Command" No date.

Phil Lapsley and Brian Kantor "Network News Transfer Protocol", Feb. 1986.

Brian Kantor and Phil Lapsley, Network News Transfer Protocol, "A Proposed Standard for the Stream–Based Transmission of News", Feb. 1986.

M. Crispin "Network Working Group", University of Washington, Dec. 1996.

Terry Gray Comparing Two Approaches to Remote Mailbox Access: IMAP vs. POP, University of Washington, Nov., 1993.

Terry Gray "Message Access Paradigms and Protocols", University of Washington, Aug., 1995.

An Interpersonal Multimedia Visualization System, Richard L. Phillips, IEEE Computer Graphic & Applications, May 1991, pp. 20–27.

Object Structure in the Emerald System, Andrew Black et al., OOPSLA '86 Proceedings, Sep. 1986, pp. 78–86.

C. Bowman, P. Danzig, D. Hardy, U. Manber, M. Schwartz & D. Wessels "Harvest: A Scalable, Customizable Discovery and Access System" Mar. 12, 1995.

D. Hardy & M. Schwartz "Customized Information Extraction as a Basis for Resource Discovery" Mar., 1994.

William G. Camargo "The Harvest Broker", Dec. 1994.

D. Bulterman, G. van Rossum and R. van Liere "A Structure for Transportable, Dynamic Multimedia Documents" USENIX, Summer '91 Nashville, TN.

G. Almes and C. Holman "Edmas: An Object–Oriented, Locally Distributed Mail System" IEEE Transactions on Software Engineering, Sep., 1987.

G. Almes, A. Black, C. Bunje and D. Wiebe "Edmas: A Locally Distributed Mail System" IEEE, 1984.

W. Bender, H. Lie, J. Orwant, L. Teodosio, & N. Abramson "Newspace: Mass Media and Personal Computing", USENIX—Summer '91—Nashville, TN.

R. Thomas, H. Forsdick, T. Crowley, R. Schaaf, R. Tomlinson & V. Travera "Diamond: A Multimedia Message System Built on a Distributed Architecture" IEEE, Dec. 1985.

S. Ramanathan & P. V. Rangan "Architectures for Personalized Multimedia" IEEE, 1994.

N. Yankelovich, B. Haan, N. Meirowitz & S. Drucker "Intermedia: The Concept and the Construction of a Seamless Information Environment" IEEE, Jan. 1988.

D. Woekl, W. Kim & W. Luther "An Object–Oriented Approach to Multimedia Databases" ACM 1986.

N. Borenstein, C. Everhart, J. Rosenberg, A. Stoller "A Multi–media Message System for Andrew" USENIX Winter Conference Feb., 1988.

S. Jackson & N. Yankelovich "InterMail: A Prototype Hypermedia Mail System" Hypertext 91 Proceedings Dec. 1991.

E. Hoffert & G. Gretsch "The Digital News System at Educom: A Convergence of Interactive Computing, Newspapers, Television and High Speed Networks" Communications of the ACM Apr. 1991.

D. Crocker, E. Szurkowski & D. Farber "An Internetwork Memo Distribution Capability—MMDF" IEEE ACM 1979.

Douglas Engelbart "Authorship Provisions in Augment" IEEE, 1984.

J.J. Garcia–Luna–Aceves "Towards Computer–Based Multimedia Information Systems" Computer Message Systems 85, 1986.

Debra P. Deutsch "Implementing Distribution Lists in Computer–Based Message Systems" Computer–Based Message Services, IFIP, 1984.

T. Purdy, D. Thorslund & N. Witchlow "Meridian SL Messaging" Computer Message Systems—85 IFIP, 1986.

Michael Tschichholz "Message Handling System: Requirements to the User Agent" Computer Message Systems—85, IFIP, 1986.

Lother Wosnitza "Group Communication in the MHS Context" Computer Message Systems 85 IFIP, 1986.

Jacob Palme "Distribution Agents (mailing lists) in Message Handling Systems" Computer Message Systems 85 IFIP, 1986.

Teresa F. Lunt "A Model for Message System Security" Computer Message Systems 85 IFIP, 1986.

A. Roger Kave "A User Agent for Multiple Computer–Based Message Services" Computer–Based Message Services, IFIP 1984.

Paul Wilson "Structures for Mailbox System Applications" Computer–Based Message Services, IFIP 1984.

J. Postel, G. Finn, A. Katz & J. Reynolds "The ISI Experimental Multimedia Mail System" Information Science Institute, Sep. 1986.

E. Moeller, A. Scheller & G. Schurmann "Distributed Processing of Multimedia Information" IEEE Computer Society Proceedings May 28–Jun. 1, 1990.

Jacob Palme "You Have 134 Unread Mail! Do You Want to Read Them Now?" Computer–Based Message Services IFIP, 1984.

Michael Caplinger "An Information System Bsed on Distributed Objects" OOPSLA '87 Proceedings No date.

M. Papa, G. Ragucci, G. Corrente, M. Ferrise, S. Giurleo and D. Vitale "The Development of an Object–Oriented Multimedia Information System" Lecture Notes in Computer Science, Sep., 1994.

Silvano Maffeis "A Flexible System Design to Support Object–Groups and Object–Oriented Distributed Programming" Lecture Notes in Computer Science, Jul. 1993.

R. Gotze, H. Eirund & R. Claassen "Object–Oriented Dialog Control for Multimedia User Interfaces" Lecture Notes in Computer Science—Human Computer Interaction Sep. 1993.

Chris Maeda "A Metaobject Protocol for Controlling File Cache Management" Lecture Notes in Computer Science, Mar., 1996.

A. Joseph, A. deLespinasse, J. Tauber, D. Gifford & M. Kaashoek "Rover" A Toolkit for Mobile Information Access SIGOPS '95 1995 ACM.

Wolfgang Lux "Adaptable Object Migration: Concept and Implementation" Operating Systems Review Apr., 1995.

R. Campbell, N. Islam, R. Johnson, P. Kourgiouris & P. Mandany "Choices, Frameworks and Refinement" Deptment of Computer Science, University of Illinois, Dec. 1991.

Klemens Bohm & Thomas C. Rakow "Metadata fro Multimedia Documents" SIGMOD Record, vol. 23, No. 4, Dec. 1994.

Simon Gibbs "Composite Multimedia and Active Objects" OOPSLA '91 No date.

T. Purdin, R. Schlichting & G. Andrews "A File Replication Facility for Berkeley Unix" Software Practive and Experience, vol. 17, Dec. 1987.

Daniel T. Chang "Coral: A Concurrent Object–Oriented System for Constructing and Executing Sequential, Parallel and Distributed Applications" OOPS Messenger, Apr. 1991.

A. Birrell, G. Nelson, S. Owicki & E. Wobber "Network Objects" Proceedings of the 14th ACM Symposium on Operating Systems Principles, Dec. 5–8, 1993.

Jacques Ferber "Computational Reflection in Class based Object Oriented Languages" OOPSLA '89 Proceedings No date.

C. Fung & M. Pong "MOCS: an Object–Oriented Programming Model for Multimedia Object Communication and Synchronization" 1994 IEEE.

T. Hase & M. Matsuda "A New Audio–Visual Control Using Message Object Transmission", 1994 IEEE, Nov., 1994.

F. Horn & J. Stefani "On Programming and Supporting Multimedia Object Synchronization" The Computer Journal, vol. 36, No. 1, 1993.

T. Little & A. Ghafoor Spatio–Temporal Composition of Distributed Multimedia Objects for Value– Added Networks, IEEE 1991.

M. Vazirgiannis & C. Mourlas "An Object–Oriented Model for Interactive Multimedia Presentations" The Computer Journal, vol. 36, No. 1, 1993.

T. Little & A. Ghafoor "Synchronization and Storage Models for Multimedia Objects" 1990 IEEE Apr. 1990.

Cosmos Nicolaou "An Architecture for Real–Time Multimedia Communication Systems", 1990 IEEE, Apr. 1990.

Ralf Steinmetz "Synchronization Properties in Multimedia Systems" 1990 IEEE, Apr. 1990.

T. Little & A. Ghafoor "Network Considerations for Distributed Multimedia Object Composition and Communication" 1990 IEEE Network Magazine, Nov., 1990.

K. Smith and S. Zdonik "Intermedia: A Case Study of the Differences Between Relational and Object–Oriented Database Systems" OOPSLA '87 Proceedings No date.

N. Yankelovich, B. Haan, N. Meyrowitz & S. Drucker "Intermedia: The Concept and the Construction of a Seamless Information Environment" Jan. 1988 IEEE.

S. Ramanathan & P. Rangan "Architecture for Personalized Multimedia" 1994 IEEE.

COMMUNICATIONS SYSTEM FOR TRANSFERRING INFORMATION BETWEEN MEMORIES ACCORDING TO PROCESSES TRANSFERRED WITH THE INFORMATION

BACKGROUND OF THE INVENTION

1. Field of the Invention

The present invention relates to data communications systems. More particularly, it relates to an automated communications system which coordinates the transfer and content of data, metadata, and instructions between databases in order to simplify, automate, and increase the intelligence of communications.

2. Discussion of the Related Art

All communications consist of a mechanism for exchanging information between one entity, a provider, and another, a consumer. The terms "provider" and "consumer" are used to designate separate functions in information transfers. Typically an entity, at various times, operates as both a provider and a consumer in any communication relationship. Significant work is required of both the provider and consumer simply to establish and maintain a communications relationship so that information can flow freely between them. Initially, consumers must first find the appropriate providers from whom to obtain the information they need. Then contact information (e.g., names, titles, addresses, telephone numbers, electronic mail addresses, etc.) must be exchanged between the provider and consumer. The contact information must be maintained by both parties so that future communications can be effected as needed. When the contact information changes for an entity, all consumers or providers having relationships with the entity must be notified of the changes. This involves more work for one or both parties to the relationship. Each must maintain accurate records of the other, notify the other of changes, and record changes received. This work extends to other data and records exchanged in the context of the communications relationship, e.g. orders, receipts, product numbers, invoice numbers, customer numbers, notes, brochures, reports, etc. Maintenance of this information requires significant human time involvement for receiving information, storing information, indexing information, searching for desired information, and retrieving information. The human component of record maintenance also creates a potential for error which can cause the information to be faulty or to become lost.

In addition to creating and maintaining communication relationships, information providers want to disseminate information about themselves or their products and services to consumers. Optimally, such information would be disseminated only to persons who need the information and only at the times that they need it. However, knowing who needs what information and when it is needed can be difficult. Therefore, providers typically disseminate information widely in the form of mass advertisements and mailings in order to reach all likely consumers.

Because of this broad dissemination by providers, consumers receive large amounts of information much of which is irrelevant to them. The consumer is forced to sort and filter through this information. Much of the information may be discarded. Information which is kept may not be immediately useful, but may be needed at a later time. Unless the consumer expends a great deal of work to store, catalog, and index this information, at the point the consumer needs it the information can be difficult or impossible to find. The provider, for its part, knows what information the provider has available, as well as the best way to access it. However the provider does not have any simple ways to know which consumers need what information at what times.

There is one more dimension to the communications relationship, and that is the work required for the consumer to respond to information of interest. For example, to order a product, the consumer must place a telephone call, locate a salesperson, and then manually transmit the necessary ordering information, which the salesperson must manually record. Paper or electronic product order forms can help automate this process for the provider, but these must be filled out by the consumer. Many of these forms require the same standard information from the consumer, which the consumer must enter repeatedly. All of these information transfers require human involvement and thus create the potential for data errors. On the provider's part, more work is required to perform error checking on the order, process it, and if necessary return an acknowledgment to the consumer. Many providers invest heavily in data processing and electronic communications systems for automating these functions. However, the lack of a standard communications system for exchanging common data results in largely proprietary systems, increasing the investment necessary for every provider. In addition, consumers must still interact with each these systems manually.

Therefore, a need exists for a communications system which allows providers and consumers to easily establish an automated communications relationship in which providers can easily offer the information consumers need, and consumers can easily access the information they need when they need it. A need also exists for a communications system which allows a provider to actively notify consumers of new information in which the they be interested, and which also allows the consumer to filter information being sent by one or more information providers so that the consumer is not distracted by receipt of unwanted and irrelevant information. A need also exists for a system which allows consumers to easily respond to information which interests them, and which allows both providers and consumers to automatically exchange and process incoming or outgoing communications data whenever possible.

Various computer-based systems have been created to provide mechanisms for communicating information. The Internet and World Wide Web provide a network of a large number of information sources, providing a voluminous amount of information. Computer programs exist which can be executed on Internet-connected computers to search these sources to obtain desired information. Additionally, through the medium of hypertext, providers of World Wide Web pages can create links in their pages between items of related information which can significantly aid consumers in finding desired information. However, these links to the information source are neither dynamic nor persistent; in the sense that they do not provide new or updated information once the consumer has found a topic of interest. "Bookmarks" in a Web browser program can facilitate subsequent access to a particular web page to determine if new information is present. However, if the web page referenced by the bookmark is removed, the bookmark is no longer valid. Bookmark polling programs, such as Smart Bookmarks from First Floor, Inc., can also be used to determine whether a web page has changed since the last time the consumer viewed it. In addition, Smart Bookmarks can examine a changed page and automatically transfer to the consumer a text string embedded by the author of the page informing the consumer of the nature of the change. However, Smart Bookmarks' capability is limited to single text strings on single web pages. Therefore the consumer must locate and bookmark every Web page of interest. Smart Bookmarks does not provide a way for the consumer to filter the update messages, nor does it provide the consumer with a means for responding to the changed information other than revisiting the page involved.

Online navigation or "auto pilot" software, available from various commercial online services or software companies, can add additional functionality to basic access to online service, the Internet, and other public networks. The software provided by these services or companies can include capabilities such as automatic logons, automatic navigation of the online system according to consumer preferences, file searches, uploading and downloading data, and storage of data. Some systems can also automatically download the data necessary to update their own operation. However, the navigation software available from the online services typically requires that the consumer first establish an account with the online service, and may also involve establishing accounts with specific providers on the service. In addition, these navigator programs are specifically designed to work with the architecture and communications protocols of the online service, and cannot be easily adapted to other data communications networks, thus preventing other providers from using the functionality of the online service to create and distribute data in the same manner. Finally, they also require that the consumer devote the effort to setting up and maintaining the communications relationship the consumer wishes to have with each information provider on the service. This last disadvantage also applies to online navigation programs designed to work with the Internet and other non-proprietary public data networks.

Electronic mail (e-mail) systems are another electronic communications system that provides some communications contact persistence. E-mail addresses and messages can be stored and indexed within e-mail programs, or externally in other locations. E-mail rules engines allow for some degree of automated storage or response to certain message contents. However, these rules engines are typically constrained to acting on certain known information about the messages, such as the address of the sender, or on semantic rules such as keywords which must be guessed by the sender and recipient. There is no common communications frame of reference, i.e., a structured data format and data operations methodology, against which both the sender and recipient can operate to filter, classify, and organize messages. The lack of a common frame of reference also severely limits the capability of either the sender or receiver to automatically process the contents of an e-mail message, or to provide a means for the recipients of a message to automate their response to the message other than the ability to automatically address a response to the sender of a message or to the sender plus all other recipients of a message.

E-mail systems which support electronic forms overcome some of these limitations. Electronic forms can be used to automatically or semi-automatically gather data and route it around a network. Electronic forms also allow message recipients to automate a response to the message sender which can be automatically processed by the sender. However, these forms must be received and processed by the recipient in the same manner as conventional e-mail messages, so they do not provide a means for the recipient to filter messages from different senders. In addition, while they may automate the sender's ability to process the data returned from the forms, the recipient must still manually enter information in the form. Forms also do not provide the recipient with a mechanism for automatically storing, indexing, or processing information from the sender.

Specialized e-mail systems have been developed that combine the use of electronic forms with a system-wide data processing model. Examples are The Coordinator from Action Technologies, Inc., or OVAL from the MIT Center for Coordination Science. These systems allow senders and recipients to share a frame of reference for messaging such that messages can be classified into specific categories and actions. This allows message senders and recipients to automate the routing, storage, and processing of messages based on these category and actions. However, these systems require that all senders and recipients share the same frame of reference. They do not provide a generalized means for each sender on the system to establish their own frames of reference with one or more recipients, nor a generalized means for each recipient to coordinate the frames of reference they have with different senders, while still using a generalized data storage and processing model that can be shared among all users of the system.

A different approach to the problem of automating communications is the category of software that is commonly referred to as "software agents" or "mobile agents". An example is a platform for communications applications developed by General Magic, Inc. called Telescript. The Telescript language is an object-oriented, remote programming language with three core concepts: agents, places and "go". Agents "go" to places, where they interact with other agents to get work done on a user's behalf. Agents are mobile programs capable of transporting themselves from place to place in a Telescript network. The language is implemented by the Telescript engine. The Telescript engine is a multitasking interpreter that integrates onto an operating system through a programming interface called the Telescript API. The Telescript engine operates on server computers interoperating on a communications network. Telescript agents can operate independently anywhere within these server computers to control the transfer of message data and perform programmable actions upon that message data. For example, if a message recipient is not available, the message could be rerouted to a different location, rather than being returned to the sender undelivered. Telescript is similar to other agent technologies in that the architecture is based on agents interacting with other agents on server computers running the agent "engines" or interpreters. In this architecture, the establishment of a communications relationship requires two agents: one to represent the provider and one the consumer. Although agent programming systems like Telescript provide the necessary tools for creating these agents, it is still necessary for both the provider and consumer to create and administer the necessary agents. Furthermore, Telescript does not provide a specific data model for the filtering, storage, and indexing of communications between a provider and consumer. Lastly, agent architectures require the addition of servers running agent interpreters or "engines" to the communications network in order to operate, increasing the expense and complexity of the network.

Another approach to automating communications and information transfers is shared replicated database systems such as Lotus Notes and Collabra Share. With these systems, information to be communicated is entered via a client program into shared databases which may reside locally on client computers or on network server computers. These databases are then replicated through the server computers to other server computers or local client computers throughout the system so that the data can be accessed by any other user of the system who needs the information and has the proper access privileges. Access privileges are controlled by one or more system administrators via the system servers. Some of these systems, notably Collabra Share, also allow users to "subscribe" to specific databases. These users can receive an e-mail notification when a new entry has been made in that database. These systems may also employ electronic forms and forms processing languages to structure the data being entered into a database, and to take programmable actions based on the data entered. The architecture of these systems is designed for large groups of users to share information related to specific topics, and to automate the transfer of data between different computer applications used by an organization. For this reason the basic component of the architecture is an individual database or "forum". Each forum covers a number of related interest topics under which all forum entries are categorized. All copies of any forum are synchronized throughout the system when data in one copy has been changed.

While optimal for information sharing amongst the members of a group, this architecture is not well suited for automating communications relationships among a large number of information providers and consumers. First, all the providers and consumers need to be interconnected through the system in order to communicate. This could be done by having all providers and consumers enroll in one large system in which they all had access privileges. In such a system each provider would need to have at least one forum for communicating with his/her consumers. This enormous number of forums would then need to be replicated among the large number of servers required to service the complete population of the system, which would quickly overwhelm the capacity of the servers or network to handle replication. A more realistic alternative would be to have each provider or group of providers operate and administer their own system, making their internal forums available to consumers via public data networks such as the Internet. Consumers would use the system client software to "subscribe" to the forums of each provider with which they desire to communicate. Only the forums a consumer subscribed to would be replicated on his/her desktop. This solution would spread the replication load to a large number of servers, each handling a smaller amount of traffic. However, each server would now have to manage replication for a large number of external consumers as well as internal group members. There is no way to distribute this replication load to the consumer's computer. Second, because replication is handled at the forum level, consumers cannot fully filter the incoming communications from providers; they must still scan the forums for items of interest. Providers could surmount this by creating a forum for each interest topic, but the additional administrative overhead and server replication overhead would strongly discourage this. Third, because notification of new information is handled via a separate application, e-mail, the consumer is forced to coordinate notification and data storage/response among two communications systems. Finally, because the entire system depends on server-based replication, administrative changes or reconfigurations of these servers such as system name or address changes require that all subscribing consumers be updated, a job which consumers must handle manually.

Consequently, a need exists for an automated communications system which allows providers and consumers to quickly and easily establish an automated communications relationship, simplify the transfer and storage of information between both parties, provide a common frame of reference for the automated filtering and processing of information, and flexibly adapt to the multiple communications networks or systems that may be in use by either the provider or consumer.

SUMMARY OF THE INVENTION

The disadvantages of existing communications systems are significantly overcome by the present invention in which software programs being executed by a provider computer and consumer computer communicate directly in order to provide an automated transfer of information, including data, metadata, and instructions. The metadata and instructions control how the information should be processed by a program executing on the consumer computer and how responses to that information are processed on the provider computer. The transfer of information is used to control and automate the communications relationship between the provider and consumer.

In one aspect of the present invention, a communications system is used to coordinate communications between providers and consumers. Provider computers transfer information stored in the provider computer through a communications network to a consumer computer. The information includes processes for updating the transferred information in the consumer computer when the information in provider computer has changed. For "push" processes, the provider computer maintains address data necessary to transfer updated information to various consumers. For "pull" processes, the consumer computer uses information transferred from the provider to access a location where the provider information is stored to determine whether it has been updated and to retrieve it if necessary.

According to another aspect of the present invention, existing communications networks and network accessing programs are used to increase the functionality of the communications system. The Internet and World Wide Web, or similar type networks, are used to access and transfer the information. According to this aspect, information is created and maintained according to a recognized protocol, such as HTTP, MIME and HTML, which can be used to access other information. An appropriate display program, such as a web browser, is used to retrieve and display the information.

According to another aspect of the present invention, programs operating on the provider computer and consumer computer operate as state machines in connection with an appropriate display program. The programs operate to receive information requests from a display program and to generate a next display containing the requested information.

According to another aspect of the present invention, information is organized in a form which simplifies transfer of data, metadata, and instructions. Object oriented programming is be used for combining data and methods for storage and transfer. Specialized classes or types are used to provide intelligence in processing of transferred information. Elements in an transferred object can be used by the consumer computer to filter information and provide selective notification to a user of changed information. The combination of methods and data permits joint control by the provider and consumer of the information transferred, responses, acknowledgments, and update processing.

According to another aspect of the invention, a provider program is used to create, edit, and maintain data, metadata and instructions in a provider database. The provider program also controls distribution of the information to various consumers. Different information contained in the provider database can be transferred and used in communications relationships with different consumers. The provider database includes information associating the information with each potential recipient. The association information is used to selectively distribute information and updated information. The provider program also receives and uses information from the consumer computer to control encoding and transfer of information to the consumer computer. According to another aspect, the provider program uses a markup language to format the information for transfer.

According to another aspect of the invention, a consumer program is used to receive and process the transferred information. The consumer program receives information from the provider or polls a location identified by the transferred information to determine when information has been updated by the provider. The consumer program then retrieves the information from the proper source and compares it to the existing information to determine what has been updated. The consumer program maintains a database of information from different providers. When updated information is received, the consumer program executes instructions associated with the information to store the updated information, notify a user of updated information, and generate responses for the consumer. The consumer program also can transfer the information to second consumer computer. The second consumer computer can obtain updated information from the provider computer or as forwarded by the consumer computer.

According to another aspect of the invention which can be used by providers and consumers to automate various communications services desired by both tion, method servers are used to provide metadata and instructions. The metadata and instructions are received by the provider and consumer computers in the same manner as information is received by the consumer computer. The provider can include metadata and instructions transferred from the method server in the information transferred to the consumer computer. The information transferred from the method server also controls communications with the method server for both providers and consumers.

With these and other objects, advantages and features of the invention that may become apparent, the nature of the invention may be more clearly understood by reference to the following detailed description, the appended claims, and the several drawings attached hereto.

DETAILED DESCRIPTION

System Overview

Figure 1:
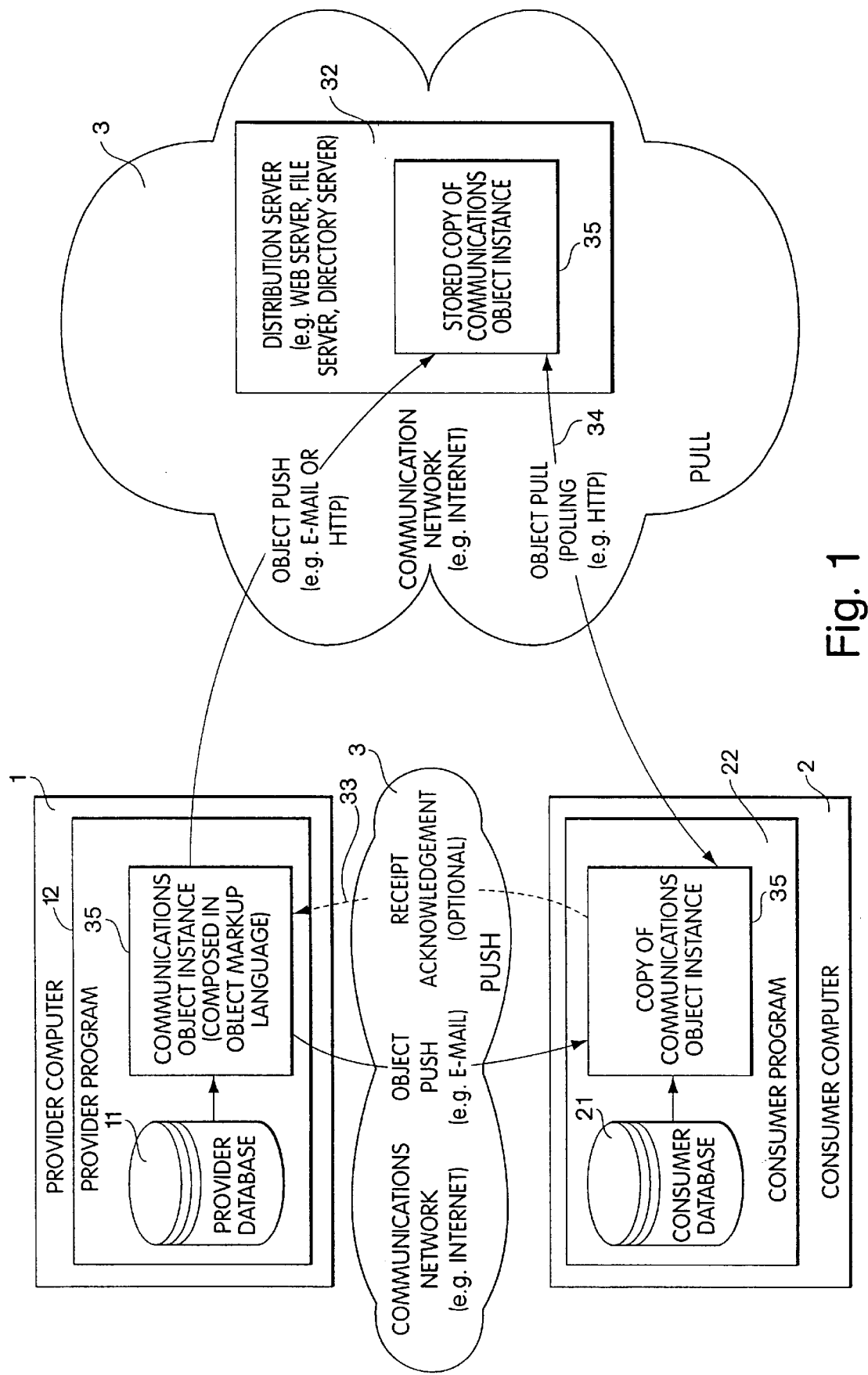
FIG. 1 illustrates a communications system according to an embodiment of the present invention.

There is illustrated in FIG. 1 a first embodiment of a system of the present invention which automatically updates a database in a consumer computer with information from a provider computer. Numerous providers and consumers exist in the system of the present invention. However, since all communications can be separated into transfers between a single provider and consumer, the design and operation of the system is illustrated with only one provider and one consumer, except as otherwise noted. As illustrated in FIG. 1, a provider computer 1 includes a provider database 11 of information which it desires to disseminate or make accessible to one or more consumers. A consumer computer 2 includes a consumer database 21 of information received from providers or stored by a user. The organization structure and content of the provider database 11 and consumer database 21 are discussed below. The provider computer 1 is connected through a communications network 3 to the consumer computer 2. Any communications network 3 may be used to connect the provider computer 1 and the consumer computer, including direct network connections, server-based environments, telephone networks, the Internet, intranets, local area networks (LANS), wide area networks (WANS), the World Wide Web, other webs, and even transfers of data on physical media such as disks or computer-readable paper outputs via postal communications networks. The particulars of the communications network illustrated as preferred embodiments are not limiting features of the invention. However, the Internet and World Wide Web provide existing connection capabilities between computers sufficient to provide the necessary connections. For this reason, the description of the present invention is based on this communications medium, which should be understood to be used for purpose of illustration only. Organization and operation of the Internet and communications over the Internet are discussed generally in Kris Jamsa and Ken Cope, *Internet Programming* (1995) and Marshall T. Rose, *The Internet Message: Closing the Book with Electronic Mail* (1993), which are incorporated herein by reference. Communications over the World Wide Web are discussed generally in John December and Neil Randall, *The World Wide Web Unleashed* (1996), which is incorporated herein by reference. Additionally, the illustration is not limited to the specific networks known as the Internet and Wold Wide Web, but relate to internet, intranet and web networks generally. A specific feature of this invention is that it is easily adaptable to automating communications via any type of communications network. In addition, it can select an optimal communications network and message encoding format to be used for a specific communications transaction.

As illustrated in FIG. 1, there are two principal methods for data transfer in a data communications system, both of which can operate through the Internet. First, a "pushing" method transfers information from the provider computer 1 directly to a known consumer computer 2. An example of such a system is e-mail. So long as the consumer's address is known, the information can be routed through the communications network directly to that recipient. For the pushing method, the provider must know the consumers who want to receive the information. The provider must also know how to address those recipients.

The second method, referred to as "pulling", occurs when the consumer computer 2 requests and initiates a transfer of information directly from a provider computer 1 or from another server computer 32 located on communications network 3 on which a copy of the information has been placed for distribution. An example of such a distribution server 32 is when a copy of the information is placed on a web server and accessed by the consumer computer 2. In the pulling method, the provider and the provider computer 1 or distribution server 32 do not need to know ab initio, the identity or location of consumer computers 2. Rather, the consumer computer needs to know the location of the provider computer 1 or distribution server 32 and the location of the desired information to be accessed on such computers.

Basic Operation of Programs for Communications

Appropriate programs executing on the provider computer 1 and the consumer computer 2 perform the functions necessary to update data and maintain the data at both locations. A program represents a set of store instructions which are executed in a processor of the computer to process data, transmit and receive data and produce displays. The provider program 12 operates to transmit changes in data stored in the provider database 11 at the provider computer 1. When changes are made to the information and the database, the provider program 12 operates to disseminate the changed information through the communications network 3. In the pushing method, the provider program 12 transmits the changed information, for example through e-mail, to the consumer computers 2 of all intended recipients. In the pulling method, the changed information is stored on a distribution server 32, such as a web server, which then can be accessed by the consumer computer 2. The consumer program computer 22 will typically poll the distribution server 32 to determine whether the information has changed. This polling operation can be a simple as issuing a Web server HTTP file date request and comparing this with the file date of the last update. Polling is controlled by the information transferred from the provider program to the consumer program as further described below. Upon receipt of changed information, the consumer program 22 operates to perform certain functions with regard to that changed information. Principally, the information is stored in consumer database 21 in the consumer computer 2 for future reference and usage in automating communications from the consumer to the provider. Furthermore, the information may be presented to a user at the consumer location, so that the user will know of the changed information. The information can be presented in a number of manners, including display or printing by the consumer program, sending an e-mail or voice-mail message to the user, paging the user, and other notification methods. Since the provider knows what the changed information is and how consumers would likely prefer to be notified of the changed information, the transmittal of the changed information can include instructions on how the consumer program 22 should process the information for purposes of notification. For example, information from a provider may include the provider's telephone number. If the telephone number changes, the provider needs to supply everyone with whom it does business with the new number. The present invention provides a simple way for carrying out such a data transfer, and of controlling which consumers receive overt notification. When the telephone number is changed in the distribution database at the provider computer 1, the information is transferred to the consumer computer 2, through either the push or pull method. Upon receipt, the consumer program 22 will process the changed information and store the new telephone number in the consumer database 21 for later access by the user or by other programs operating on the consumer's computer 2. At the consumer computer 2, the consumer may or may not be interested in overt notification of the new phone number; this depends on the consumer's relationship with the provider and how often and in what manner the consumer makes use of the phone number. This invention provides a way for notification to be cooperatively controlled by both the provider and consumer through the use of notification elements, which is described below.

Additionally, receipt and storage of the new or updated information can trigger other actions, such as automatically forwarding the information to another consumer, exchanging information with the consumer database 21, sending an automated response to the provider, or sending a message to another software program on the consumer's desktop. Again, this invention provides a means for such actions to be cooperatively controlled by both the provider and the consumer through the use of object methods, which is discussed below.

The information stored in the consumer database 21 can also include data, metadata, and instructions to be used by the consumer program 22 for processing consumer responses to the provider. Again, because the provider of the information knows what response options are available to the consumers of the information, the provider can include the necessary data and instructions to simplify and automate specific responses from the consumer to the provider. For example, the provider can include Web URL links to other Web pages or forms on the provider's Web server. Or the provider can also include special forms to be processed by the consumer program 22 that allow the consumer to automatically or semi-automatically transfer data from the consumer database 21 back to the provider. Examples include product order forms, survey forms, customer service request forms, scheduling forms, etc.

In the most general case, because the provider knows what communications networks, network addresses, languages, encoding formats, data structures, and other communications processing data and methods are generally supported by the provider, the provider can include in the transferred information the data, metadata, and instructions necessary to automate general communications from the consumer to the provider. For example, data and instructions in the transferred information can be used by the consumer program 22 or other computer programs running on the consumer computer 2 to automatically format, compress, encrypt, address, and transmit multiple copies of a word processing document.

HTML and HTTP Server Program Format

Figure 2:
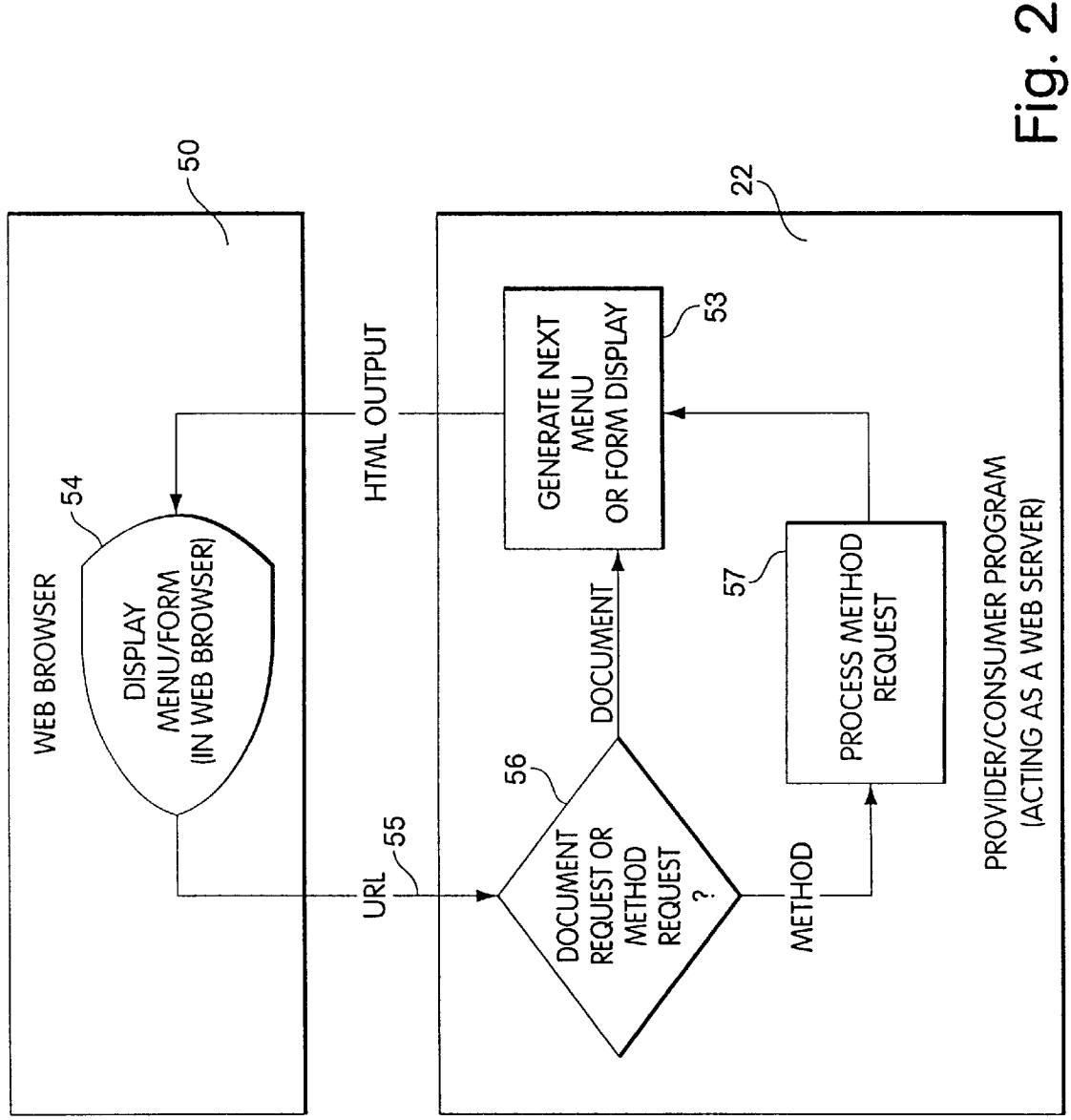
FIG. 2 illustrates an embodiment of the provider program and consumer program of FIG. 1 as state machines.

Although any kind of data communications network and any kind of user interface can be used, the system can be constructed to work with existing Internet or World Wide Web protocols for data communications and display. In particular, the provider program and the consumer program can be designed to use HyperText Mark-up Language (HTML) for display and editing. HTML is discussed in Internet Request for Comment No. 1866, which is incorporated herein by reference. The use of HTML allows links to be made to other transmitted information or to other information accessible anywhere on the World Wide Web. Also, HTML forms can be used as an input mechanism. Standard Internet protocols for accessing the Web can also be used for accessing the information in the provider or consumer databases. To do this, the provider program and consumer program are designed to emulate a Web HyperText Transfer Protocol (HTTP) server. Then, any Web browser program conforming to the HTML/HTTP standard can generate Uniform Resource Locator (URL) requests to retrieve information from the provider and consumer programs and databases. A Web browser program is a set of instructions which causes the computer to execute information requests to servers, to receive, store and display HTML data from servers in response to requests. Protocols or formats other than HTML/HTTP can be used in the same manner, with an appropriate interface program for requesting, receiving and displaying data in accordance with the selected protocol or format. The operation of the provider and consumer programs in connection with the Web browser program is illustrated in FIG. 2. Since the provider and consumer programs operate identically in this regard, only the operation of the consumer program will be discussed.

As illustrated in FIG. 2, the consumer program 22 can be constructed to operate as a state machine in connection with a Web browser program 50. The consumer program 22 generates and outputs a first HTML screen (step 53) to the Web browser. If necessary it also issues an operating system call such as a Windows DDE request or Macintosh AppleEvent to the browser to accept this HTML file. It then waits for an HTTP request from the Web browser program 50. The HTML screen can include information having one or more different types of displayed information, namely, text, graphics, hypertext links, and forms. Text and graphics refers to information which is only viewed by the user. Hypertext links associate specific text characters or graphics display locations with specific URL requests. Forms provide locations for inputting data such as text, numbers, checkboxes, and "radio buttons" to be acted upon. Hyperlinks and forms allow HTML documents to be used for all program operations including menus, editing, reports, and error messages. The Web browser program 50 displays the HTML page received from the consumer program 22 (step 54). The user operates on the displayed page in the same manner as for any information accessed through the Web browser program 50. The user can review the text or graphics, manually input a new URL request into the Web browser's URL input field, chose a hypertext link to automatically generate a URL request, or complete and submit a form. The Web browser program, typically, can also be used to move forward and backward through previously received screens. Each of the user's actions, except reviewing text and graphics, results in a URL request being generated. The URL request is sent to the consumer program 22, acting as a Web server (step 55). The consumer program processes the URL request to determine whether it refers to a document or a method (step 56). If the URL request is for a document, the consumer program generates the new HTML page and sends it to the Web browser program (step 53). If the request is for a method, then the method is executed using any additional data supplied in the URL (step 57). After the method has been executed, the consumer program generates a new HTML page based upon the results of the method.

The user enters information to be operated upon or stored by the consumer program through the use of HTML forms. If the HTML page generated by the consumer program (step 53) includes a form, then the user can enter information in designated locations in the form. When the information has been entered, the form is submitted by selecting a button on the page, and a set of program instructions designated for the form is executed to process the inputted information is processed according to a method designated for the form. Many browser programs can cache HTML documents, so that a user could have several forms open at one time. Since the consumer program works as a state machine, it expects the last form generated to be the next one returned. If the user switches the order of the forms, a state error could occur. To prevent errors, each form produced by the consumer program can be provided with a state version number. If the version number of the returned form does not match the current state of the consumer program, then an error message can be returned rather than processing the forms out of order.

Alternatively, the provider and consumer programs 12, 22 may include separate native interfaces which have many of the functions found in a browser program, as well as the ability to provide additional functionality, such as that available in advance graphical user interfaces like those of Microsoft Windows, Windows 95, and Apple Macintosh operating systems. The provider and consumer programs 12, 22 may also call other Web helper applications or "applets", such as those produced with Sun Microsystem's Java programming language or other programming languages, to provide additional interface functions.

Data Structures

Information can be stored in the provider and consumer databases 11, 21, transferred between the provider and consumer programs 12, 22, and processed by these programs in a variety of ways. The use of software objects and object-oriented databases, and in particular their ability to encapsulate data and methods for operating on that data in a single structure, provide certain degrees of functionality which are useful in the storage, transfer, and processing of information. For example, by using objects for transmission and an object-oriented database for storage, the received object can be stored by the consumer program 22 in its database 21 without having to disconnect and store the object's variables and methods independently. In addition, the data and methods of this object can be made available to other objects in the database or program for processing operations. Object oriented databases, programs and processing are generally discussed in Grady Booch, *Object Oriented Analysis and Design with Applications,* (2nd ed. 1994) and James Rumbaugh, *Object-Oriented Modeling and Design* (1991), which are incorporated herein by reference. Thus, the following description of a preferred embodiment will discuss the use of objects. However, other methods for storing, transferring, and processing information, such as relational databases, binary files, and procedural programs, could be used.

As discussed above, the provider computer 1 includes a provider database 11 operated on by provider program 12, and the consumer computer 2 includes a consumer database 21 operated on by consumer program 22 . However, since "provider" and "consumer" are merely functional distinctions, in a preferred embodiment, a single computer and computer program would be able to operate as a provider computer 1 in executing instructions of the provider program 12 and as a consumer computer 2 in executing instructions of the consumer program 22. In this instance, only a single database may be used, if desired, to hold all of the data for transmitted objects and for received objects. The database structures described below could apply to a single database, or to separate databases if the programs operated separately. For ease of reference, in describing operation of the provider program and the consumer program, separate databases will be illustrated.

Figure 3:
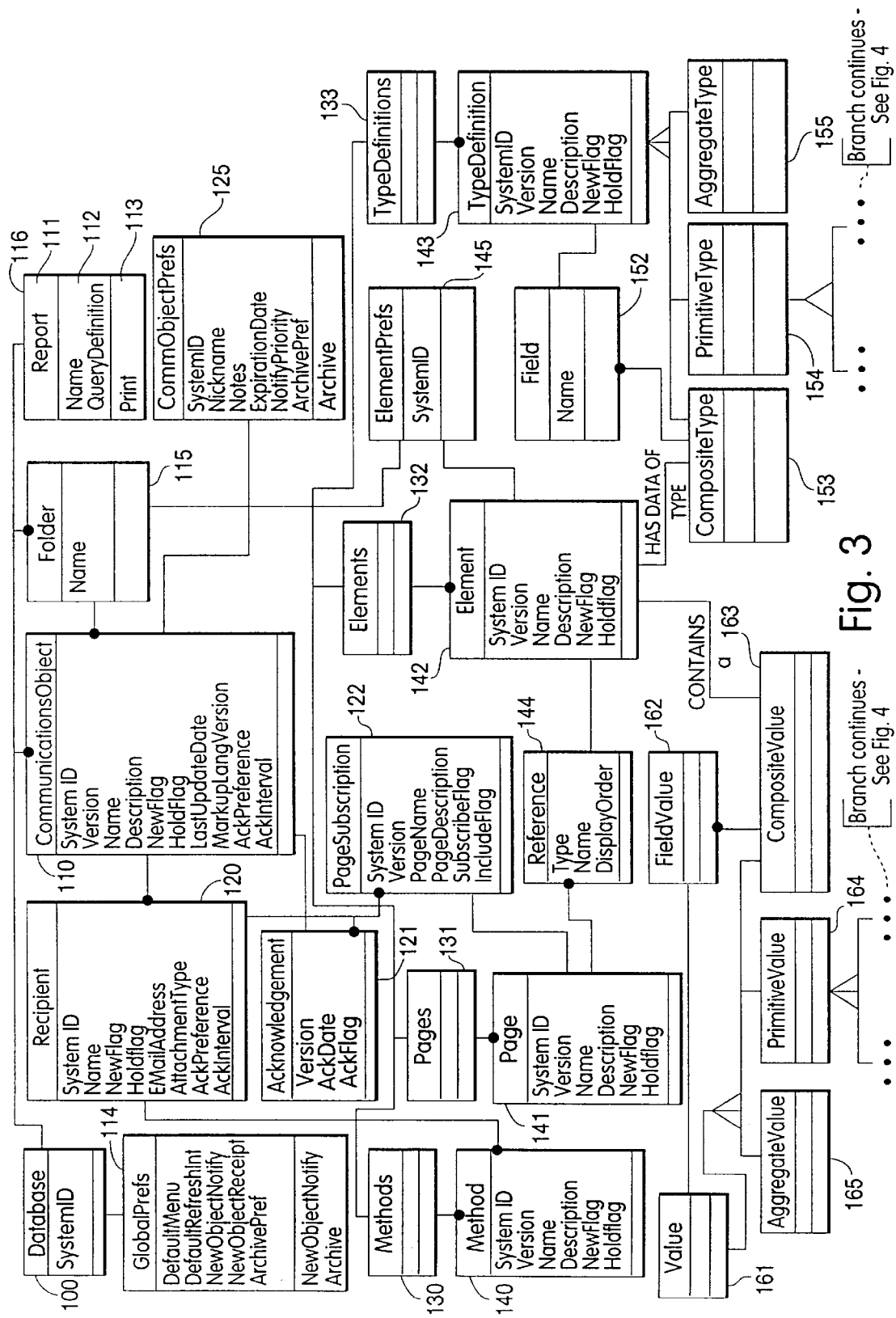
FIG. 3 illustrates object oriented data structures for storing communications data.

FIG. 3 illustrates using a standard object-oriented notational format an embodiment of object classes in a single database 100 of the present invention. Each object class includes three parts: an identifier 111, an attribute section 112, and a method section 113. The method section 113 is used to perform operations on the attributes of the class. Class associations are shown with connecting lines. A plain line shows a one-to-one association. A line terminating in a solid dot shows a one-to-many association. A line terminating in a open dot shows a optional (zero or one) association. A diamond at the start of a line shows an aggregation association, i.e. the higher class contains the component classes. Inheritance between classes is shown with a branching line.

Class Overview

There are six principal object classes: communications objects 110, recipients 120, methods 130, pages 131, elements 132, and type definitions 133. Communications objects are the core data structure transmitted from the provider program to the consumer program to control communications between the provider and consumer. Recipients include all the consumers who receive a copy of the communications object via push distribution, or the distribution servers who receive a copy of the communications object for pull distribution. The methods, pages, elements, and type definitions classes exist to define, store, and relate the components necessary to produce an instance of a communications object. Like any software object, a communications object consists of attributes and methods. The type definitions class is used together with the elements and pages classes to specify the attributes of the communications object. The methods class is used to specify the methods of the object.

The Methods 130, Pages 131, Elements 132, and TypeDefinitions 133 classes are all special container classes of the Method 140, Page 141, Elements 142, and TypeDefinition 143 classes. These special container classes are used to facilitate the rendering of an instance of a communications object in the object markup language used for object transmission, as described further below. For this reason the descriptions following will discuss only the Method 140, Page 141, Element 142, and TypeDefinition 143 classes.

Type Definitions

Figure 4:
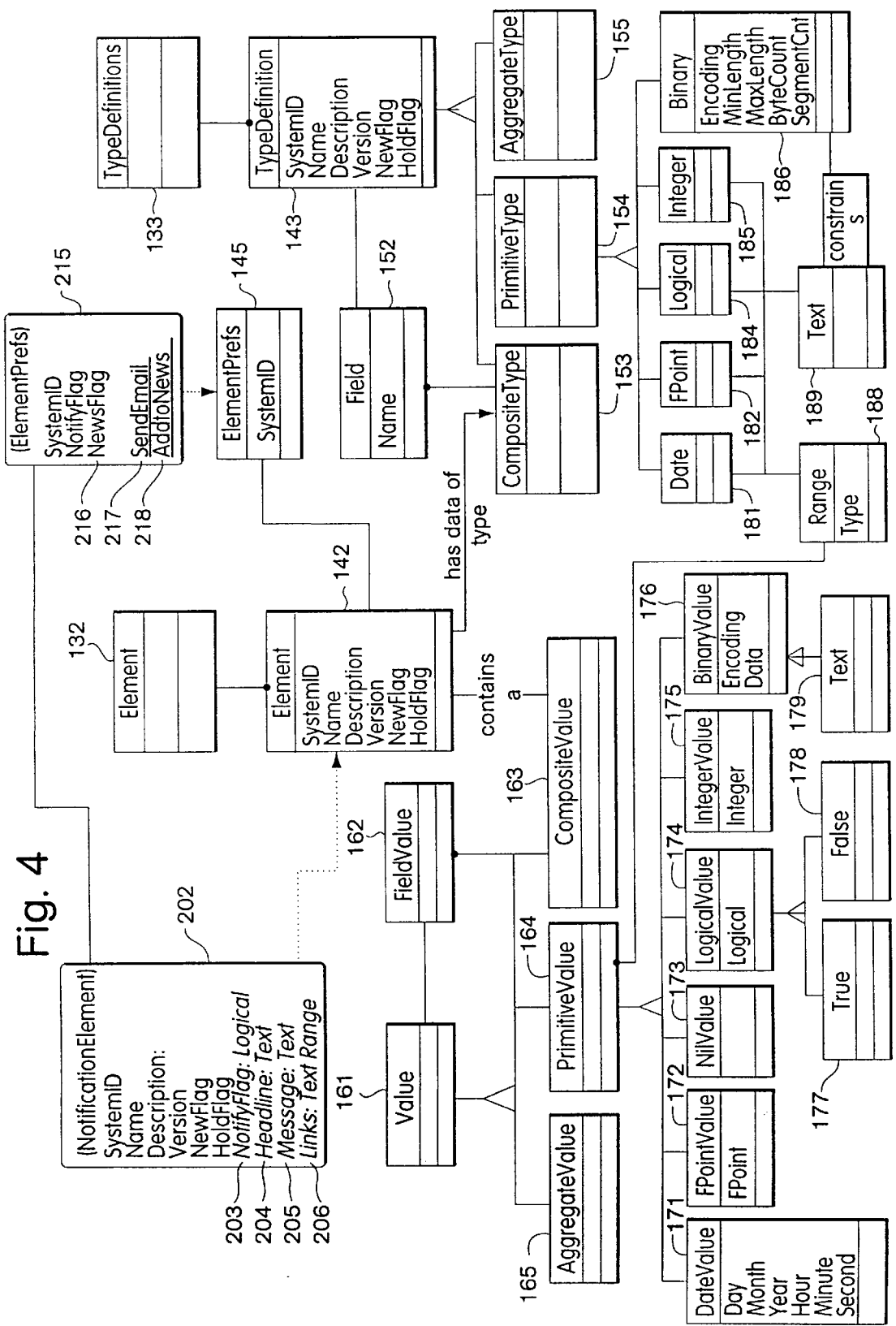
FIG. 4 illustrates the lower branches of FIG. 3, and additionally a notification element instance.

The TypeDefinition class 143 is used to define the various data types which may be used in the elements of a communications object. Type definitions can be of PrimitiveType 154, AggregateType 155, or CompositeType 153. The inheritance tree for the PrimitiveType class is shown in FIG. 4. Primitive types can include the conventional bottom-level data primitives supported by most programming languages, such as dates 181, floating point numbers 182, logicals 184, integers 185, binaries 186, etc. Text 189 is shown as a constrained form of binary 186. Range 188 is a multiplicity of other primitive data types, such as array. As shown in FIG. 3, Aggregate types 155 represent a multiplicity of primitive data types 154, such as an array. Composite types 153 represent a container of primitive types 154 or aggregate types 155 that is useful in a communications context. For instance, a composite type might be PhoneNumber. A composite type 153 is composed of one or more Fields 152 which contain the primitive types 154 or aggregate types 155 included in the composite type. For example, a composite type PhoneNumber may include fields for usage, country code, area code, number, extension, and notes, each with its corresponding primitive types. A Field 152 may also contain another composite type 153. In this way composite types can be nested. For example, a composite type BusinessCard could contain composite types Identity, PhoneNumber, PostalAddress, EMailAddress, and ContactNotes. Composite types are further explained in the discussion of elements below.

Type definitions provide a powerful tool for structuring the data included in a communications object or object update. This data structure provides the common "frame of reference" for providers and consumers to automate communications between them. In addition, this structure allows other software programs to access the data and methods contained in communications objects stored in the consumer database 21 via an Applications Programming Interface (API) in order to automate their own communications operations. The use of an API will be further discussed below.

Elements

"Elements" are the attributes of a communications object. An Element 142 might be a phone number, a postal address, an e-mail address, a text field, etc. As illustrated in FIG. 3, an element has data of a composite type 153 with a corresponding composite value 163. A composite value 163 is composed of field values 162 in the same way a composite type 153 is composed of fields 152. For instance, the field values for the composite value PhoneNumber corresponding to the composite type PhoneNumber described above could be "voice, 10188, 206, 812-6000, x101, Business hours are 9–6 daily M–F". As with fields 152, field values 162 are either an aggregate value 165, primitive value 164 or composite value 163. The value class 161 represents an abstract class inherited by the aggregate value 165, primitive value 164 and composite values 163 classes. Aggregate values 165 represent a multiplicity of primitive data values, such as an array. Primitive values 164 contain the values corresponding to the lowest level primitive types. These are shown in the continuation of the class hierarchy in FIG. 4. Primitive values include date values 171, floating point number values 172, nil values 173, logical values 174, integer values 175, and binary values 176. Text values 179 are shown as a constrained form of binary values 176. Logical values branch into true values 177 and false values 178.

Many elements with defined composite data types and composite values are specifically useful in the context of communications automation. Standard element composite types can include standard types of contact information that might typically be shared between providers and consumers in the context of a communications relationship. These include names, titles, phone numbers, fax numbers, postal addresses, e-mail addresses, URLs, and customer numbers. Nested composite types, such as the business card, allow for powerful combinations of smaller composite types.

Other element composite types are useful for the storage, transmission, and display of communications content between the provider and consumer. These elements include text blocks, graphics, and HTML. HTML elements are especially useful in the preferred embodiment as they can contain standard HTML documents which the consumer program 22 can pass directly, or with minor modifications, to the Web browser 50 for display. This allows the provider to control the appearance of data on all or a portion data being displayed, and also allows the provider to include URL links to the provider's Web server or any other related Web documents. These links can be activated immediately by the consumer when viewing the communications object using the Web browser 50 just as with conventional HTML documents. HTML elements may also include the provider's own HTML forms for acquiring information from the consumer when the object is transferred.

Another important category of element composite types is link elements. Link elements within a communications object are the equivalent of URLs within a Web document. They create associations between different elements of an object, different pages of an object, or different communications objects. A link element can also be a URL, linking the element to any Web page or other resource available on the World Wide Web.

Special element composite types, called preference elements, are used by the consumer program to control communications object processing. Preference elements specify object attributes that are editable by the consumer. For instance, a preference element of a composite type RefreshInterval could govern the polling interval used for object updates using the pull method of updating. An element of type RefreshInterval consists of three fields 152: Minimum, Maximum, and Setting, all of which would be primitive integer values representing days. The Minimum field specifies the minimum refresh interval (to help reduce the load on the provider's Web server), the Maximum field specified the maximum refresh interval (to limit the total time one full object update cycle can take), and the Setting field specifies the interval to be used (the provider's recommended setting would be used by default). The provider would initially fill out these three fields, then the consumer would be able to edit the Setting field within the Minimum and Maximum allowed.

Another example of a preference element is a notification element. Notification elements are used to control how a consumer is notified of new information when the object or an object update is transferred. The format and structure of notification elements are discussed below in connection with the special processing notification elements receive. Any other consumer-editable preference regarding object attributes or method processing can be expressed as an preference element. Preference elements receive special processing by the consumer program 22 and storage in the consumer database 21 which will be further described below.

In addition to the composite type and composite value, each element 142 includes standard attributes such as system ID, name, description, version number, NewFlag, and HoldFlag. Each element in the database has a unique identification number. Identification number assignments throughout the database are discussed below. The name is used as a label for identifying the element to the provider or consumer. The version number is used to coordinate updates each time the element is changed. The NewFlag is set to TRUE each time an element has been changed by a provider so that new information can be efficiently updated when an updated object is transferred to the consumer program. The HoldFlag is used to identify changed elements which are not yet to be distributed. The structure and content of elements may be more fully understood in connection with the description of the notification element type discussed below.

Pages

Figure 5:
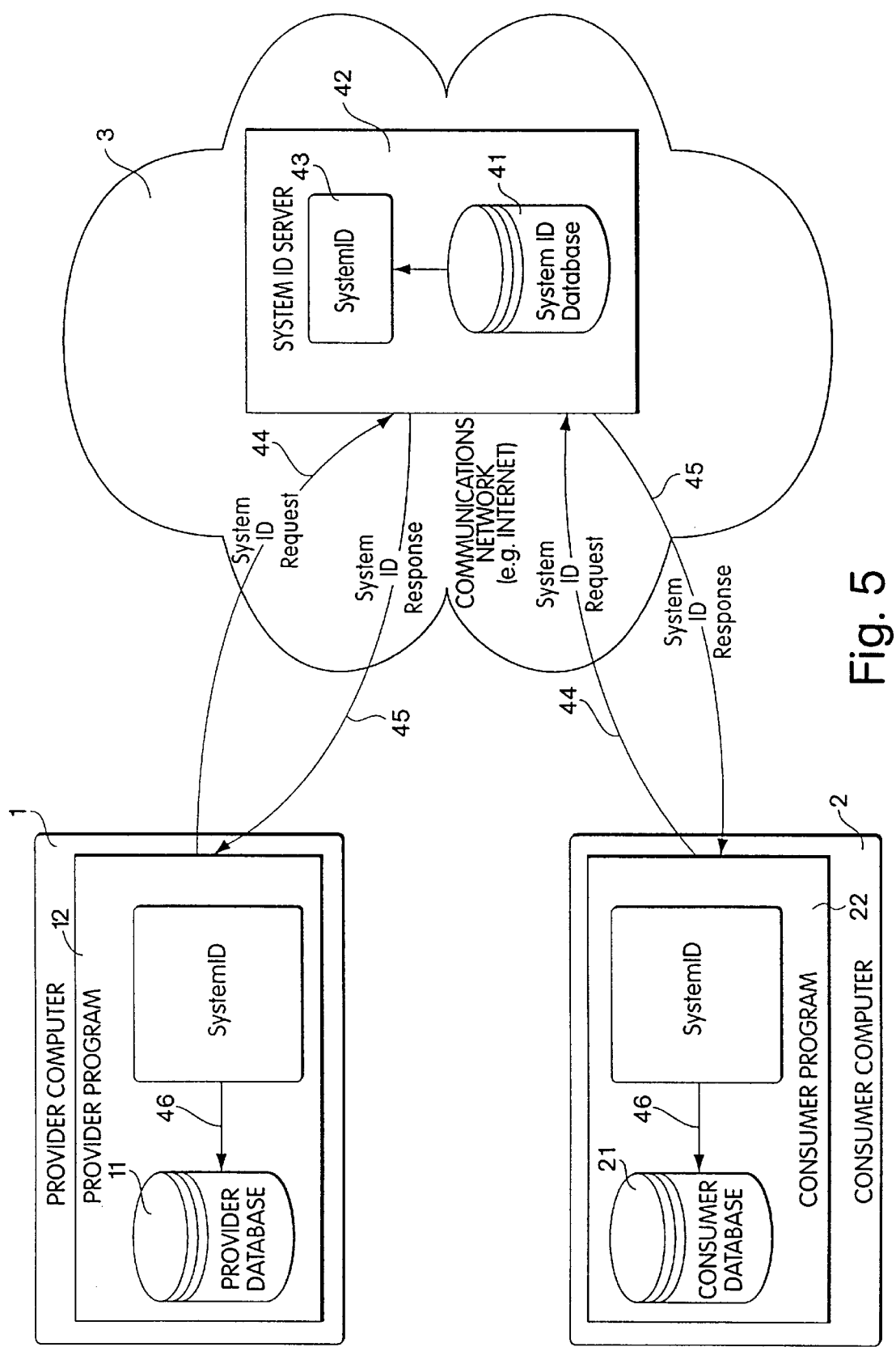
FIG. 5 illustrates the use of a system ID server.

In order to organize the many elements 142 which can be contained in a communications object 110, one or more container classes may be desired. Container classes allow the grouping of elements for purposes of display, editing, or other program operations. Container classes are also useful for controlling selective distribution, which will be discussed below. Different types of container classes can be implemented, and container classes can contain other container classes. FIG. 5 illustrates the implementation of one primary container class: the Page class 141. A page contains one or more Reference instances 144 which associate Elements 142 with the page. References may contain attributes such as DisplayOrder which control the display order of the elements on the page. Each Element 142 must assigned to at least one page 141 in order to be transmitted with an object, however an element may be included on more than one page 141. Standard page attributes are similar to the standard element attributes, i.e., SystemID, Name, Description, VersionNumber, NewFlag, and HoldFlag.

Methods

The Method class 140 is a form of metadata used to store methods which may be included in a communications object instance when it is transferred to a consumer. These methods should not be confused with the methods belonging to each of the other object classes in the system. A method object is simply a mechanism to store a method in the database for later inclusion in a communications object instance, at which time the method becomes a formal method of the communications object. Communications object methods are one of the most powerful aspects of communications objects. They allow the provider to specify processing instructions which will execute on the consumer's computer when certain conditions exist in the consumer program. For example, when a communications object is first received by the consumer program 22, a "receipt method" may automatically execute to return an acknowledgment message to the provider with information about that consumer transferred from the consumer database 21. Instances of the Method class 140 may implement communications object methods in several ways. The method could simply be a call to execute a system method included in the consumer program 22. The method could be actual instructions included in the object as program code in an executable format or interpretable format, such as a script format. The method may also be a remote procedure call to another application or object located on the consumer's computer or on a communications network accessible from the consumer program where the method can be executed, or from which the method can be downloaded by the consumer program for local execution. The application of communications object methods to automating operations in the consumer program 22 will be further discussed below.

Communications Objects

Communications objects 110 are the highest level data structure because they serve as the container for type definitions, elements, pages, and methods. Each of these is a one-to-many relationship. A type definition 143, element 142, page 141, or method 140 must be assigned to an object 110 in order to be transferred to a consumer, however each type definition, element, page, or method may be included in more than one object 110. Communications objects have many of the same standard attributes as elements, pages, and methods, i.e. SystemID, Name, Description, VersionNumber, NewFlag, and HoldFlag. In addition communications objects also have attributes that apply only to communications objects as a whole. These attributes include the markup language version used to generate instances of the object, the class the communications object belongs to, the objects' age, and the number of published updates to the object.

Recipients

The Recipient class 120 is used to determine the distribution of a communications object. Each communications object 110 is associated with one or more recipients 120 who are to receive an instance of the object when it is first created or when changes are made to it. Recipients are of two types: consumer programs 22, or distribution servers 32. Transfer of communications objects 110 to both types of recipients is typically via the push technique. However recipients may also be tracked here even if they use the pull technique of updating via the use of acknowledgment messages, as described further below. The push method may involve a fully automated transfer via a communications network, or it may involve a manual transfer such as a file copy over a network or via a computer floppy disk. Recipient objects 120 include the attributes necessary to generate and transmit an instance of the communications object to the recipient. To uniquely identify recipients even when names change, a SystemID attribute can used in addition to a Name attribute. SystemIDs are discussed below. Other attributes include the recipient's communications network address, such as an e-mail address, the type of encoding that should be used (e.g. MIME, BinHex, UUencoding, etc.), and the maximum attachment file size (to determine if multiple attachments need to be sent). Recipients 120 have an association with Methods 140 in order to allow different methods to be assigned to different recipients. An example is the communications object's update method. Communications objects transmitted to consumers via e-mail push may use one update method, while those transmitted to distribution servers may use a different update method. Other methods such as encoding methods and transmission methods may also be assigned in this manner.

Recipients 120 also has an aggregate association with acknowledgment 121 and page subscription 122. Acknowledgment 121 has a one-to-one association with communications object 141. Acknowledgment 121 is where consumer acknowledgment of communications object receipt is stored. Acknowledgment messages will be described below. Page subscription 122 is the mechanism by which a provider can control selective distribution by specifying which pages are transferred to a recipient. Alternately, by including in the communications object 110 all instances of Page subscription 122 for all pages 141 contained in the object (but not necessarily transmitted to the consumer), the provider can allow the consumer to choose which pages the consumer wants to receive. Selective distribution is described further below.

Other Classes

Three other classes in the database significantly involved with program operations are Global Preferences 114, Folder 115, and Report 116. Global Preferences 114 provides a means for storing the providers or consumers preferences for general operation of the provider program 12 or consumer program 22. This may include attributes such as the default menu to display upon program startup, the default refresh interval to assign to new objects, the user's preference for notification when new objects arrive, the number of object archive copies the user wishes to keep, and other such preferences. Global Preferences 114 may also include method preferences, such as the notification method to use when new objects are received, the method to use for archiving versions of objects or object components, and the method to use for backing up the database.

Folder 115 is a container class useful for grouping objects, particularly for consumers. Folder groupings allow objects to be referenced simultaneously for analysis, display, sorting, searching, and transmission. Alternatively, although not shown, other container classes can be applied to other classes, such as pages and elements, for similar purposes.

Report 116 is a class for storing report definitions and display or printing preferences. As in many database management systems, reports may be defined by the system or by the user, and can include any listings, statistics, or analysis of value to the user.

System ID and Naming Services

Because communications objects and their component type definitions, elements, pages, and methods are exchanged among multiple providers and consumers, the instances of these objects and components need to be uniquely distinguishable in each provider database 11 and consumer database 21. Name attributes alone cannot be relied upon to guarantee uniqueness. Other unique identification numbering systems could be employed, such as the provider's or consumer's U.S. Social Security numbers, U.S. Federal Employer Identification Numbers, passport numbers, etc. However, in a communications system which may be used globally, not all users may be assigned identifiers under one of these identification systems. A separate global identification system could be employed, such as the domain naming and e-mail addressing system used by the Internet. Although not all Internet users have their own Internet domain names, all of them have unique e-mail addresses. However, since users can and do change e-mail addresses, this would require that their system ID also change. The ideal communications system allows complete separation (or "abstraction" in object-oriented terminology) of a user's communications system ID from any real world names or physical communications network addresses with which the user is associated. In this way, users can change names or physical communications network addresses while maintaining the continuity of their communications relationships. In addition any changes to the user's name or physical communications network address can be automatically propagated by the user's communications object(s) to all the other consumers with whom the user has a communications relationship.

To achieve this objective, the present invention assigns a unique system ID value to each unique communications object and communications object component. This function is the equivalent of an automatically-generated unique key field ID in conventional database management systems.

As shown in FIG. 5, a central system ID server 42 is used to perform this function. This ID server contains a database of system ID assignments 41. The system ID database 41 could also be replicated across a group of ID servers 42 at various nodes of communications network 3 to improve performance as the number of users increases. Upon initial installation, each provider program 12 or consumer program 22 sends a request 44 via the communications network 3 to the ID server 42 for a unique system ID 43. The ID server 42 returns a response 45 to the requesting program. The requesting program then saves the system ID in the provider database 11 or consumer database 21. This system ID 43 is shown in FIG. 3 as the SystemID attribute of the Database class 100. Within the database, the provider and consumer programs 12, 22 can include a function for assigning a separate unique system ID value to each instance of a communications object 110 or any class that will become a component of a communications object. In FIG. 3, these classes include the Method 140, Page 141, Element 142, and TypeDefinition 143 classes. Again, this function is the equivalent of an automatically-automatically-generated unique key field ID in a conventional database management system. Since the provider's system ID 100 is unique for the entire communications system, and since each instance of a communications object system ID 110 or any or any component class system ID is unique within the provider's database, the combination of these system IDs creates a canonical naming system capable of uniquely identifying every communications object instance or object component class instance throughout the communications system.

Figure 6:
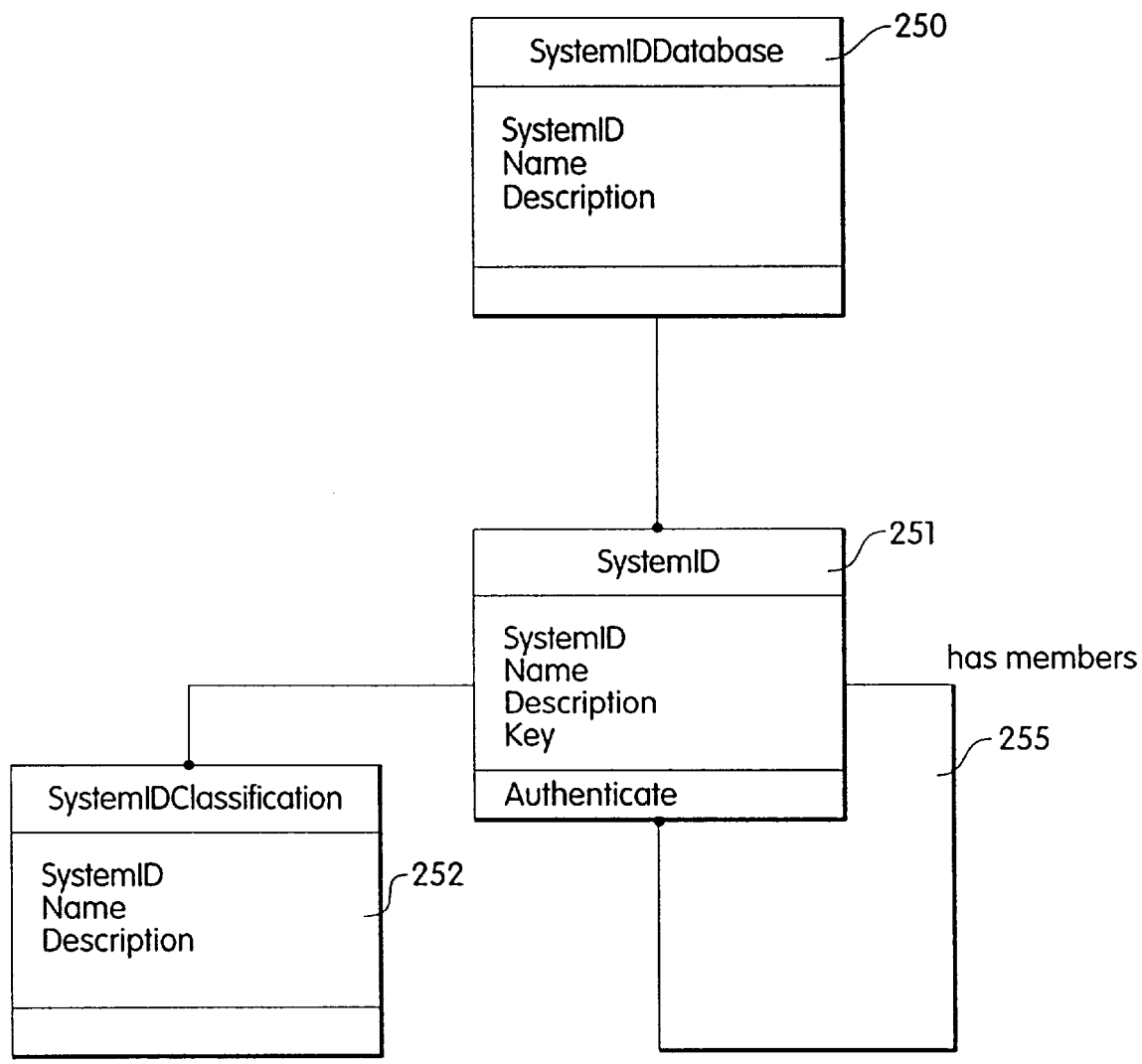
FIG. 6 illustrates object oriented data structures for storing system ID data within the system ID database.

It is also desirable to be able to assign provider groups within the communications system. Group identifiers allow providers to be classified for purposes of program licensing control, system attribute or method access permissions, object attribute or method access permissions, statistics gathering, or other purposes. For example, each employee of a large corporation who is a communications object provider needs a unique provider system ID, however the corporation needs a group ID to identify those communications objects as part of the corporation. The corporation may further desire to identify employees by subgroups such as division and department. The system ID assignment function can be modified to provide this capability simply by including nested system IDs for each group association within the system ID database 41. The object class model for nested system ID associations is shown in FIG. 6. The system ID database 250 contains any number of unique system IDs 251. Each of these may in turn contain zero, one, or more unique system IDs that function as group IDs as shown in association 255. This nesting of IDs may be as deep as necessary. Each system ID 251 includes a name and description attribute. For top level system IDs this would be the name and description of the provider. For lower-level group IDs this would be the name and description of the group (company, division, department, etc.).

Each system ID 251 also includes a key attribute. This could be a password, encryption key, or any similar value. This value could be used in conjunction with an Authentication method of the system ID 251 to verify that the user applying for the group ID is authorized to be in that group. For example, a corporate administrator could establish a group ID for the corporation. The administrator would receive the initial key for that group ID. The administrator would need to communicate that key to each employee who would supply it in the request 44 (FIG. 5) to be assigned that group ID. Each system ID 251 can also be associated with one or more system ID classifications 193. System ID classifications can be used to establish system-wide groups useful for program licensing, statistics, access permissions, or other purposes.

Since the system ID server 40 is available system-wide, and includes at least one system ID object in the system ID database 41 for each provider, which contains the provider's name, description, and an authentication key, the system ID server 40 is a suitable mechanism to offer both system name directory services and system authentication services. These services are further described below. instance throughout the communications system.

The system ID assignment function can be further improved by using communications objects included with or downloaded by provider and consumer programs 12, 22 to control the access of the provider and consumer programs 12, 22 to the system ID server 42. For example, if a group of system ID servers 42 was employed for performance or loading reasons, a communications object could determine the optimal member of the server group to access. The use of communications objects create automated communications relationships with special method servers is further explained below.

Object Transfer Processes

Figure 7:
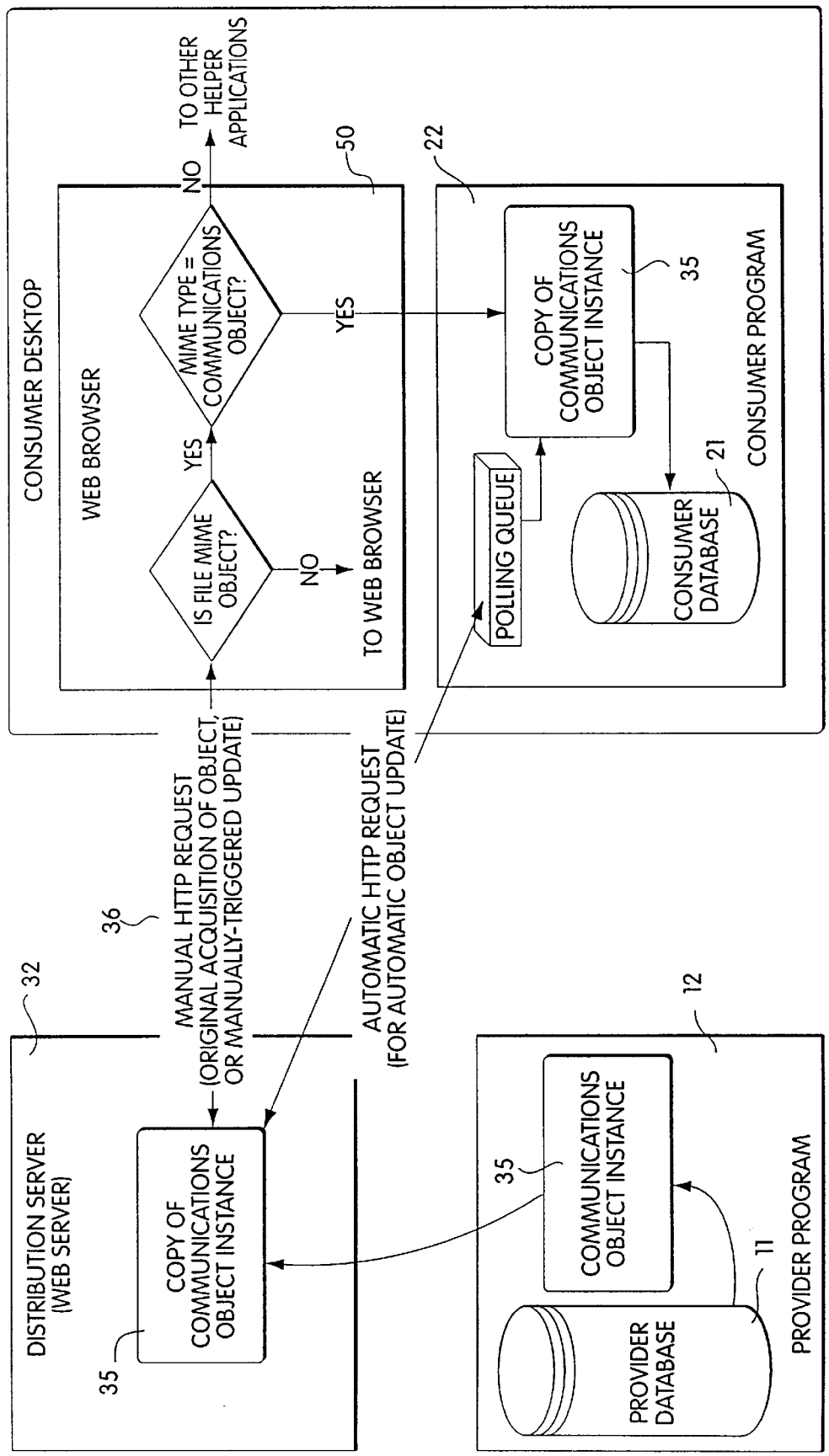
FIG. 7 illustrates a pull method of transmission of a communications object.

Besides using HTML as a display protocol, the Internet and World Wide Web also offers suitable protocols for accessing and transferring communications objects. A Web browser program 50 can be used both to retrieve the communications object and display it for viewing and editing to the consumer. The transfer of an object using a Web server 32 is illustrated in FIG. 7. The browser 50 issues a HTTP request 36 to the Web server 32 to receive the communications object markup file 35 which is located on the Web server 32. The HTTP request 36 can result from a URL manually entered by the user or through selection of a URL link from any Web page. Thus, providers who have World Wide Web documents can create links to their communications objects in those documents. A consumer can obtain a communications object simply by using a browser 50 to select the link. The object itself is then transferred as a standard Multimedia Internet Mail Extension (MIME) object type as defined by the Web HTTP protocol, in response to the HTTP request. The MIME type is discussed in Internet Request for Comment Nos. 1521 and 1522, incorporated herein by reference. As with other MIME objects, the browser program 50 determines whether a helper application exists for this type of MIME object. For a MIME type which uniquely identifies communications objects, the browser program 50 transfers the object to the consumer program 22 as the helper application. The transfer to the consumer program 22 principally results in the execution of a set of processing steps. These processing steps include storage of the object in the consumer database 21. The consumer program 22 can also execute other processing steps based upon the version of the object, preference elements, other consumer preferences, and methods in the object. The processes for storing and processing objects is discussed below.

Figure 8:
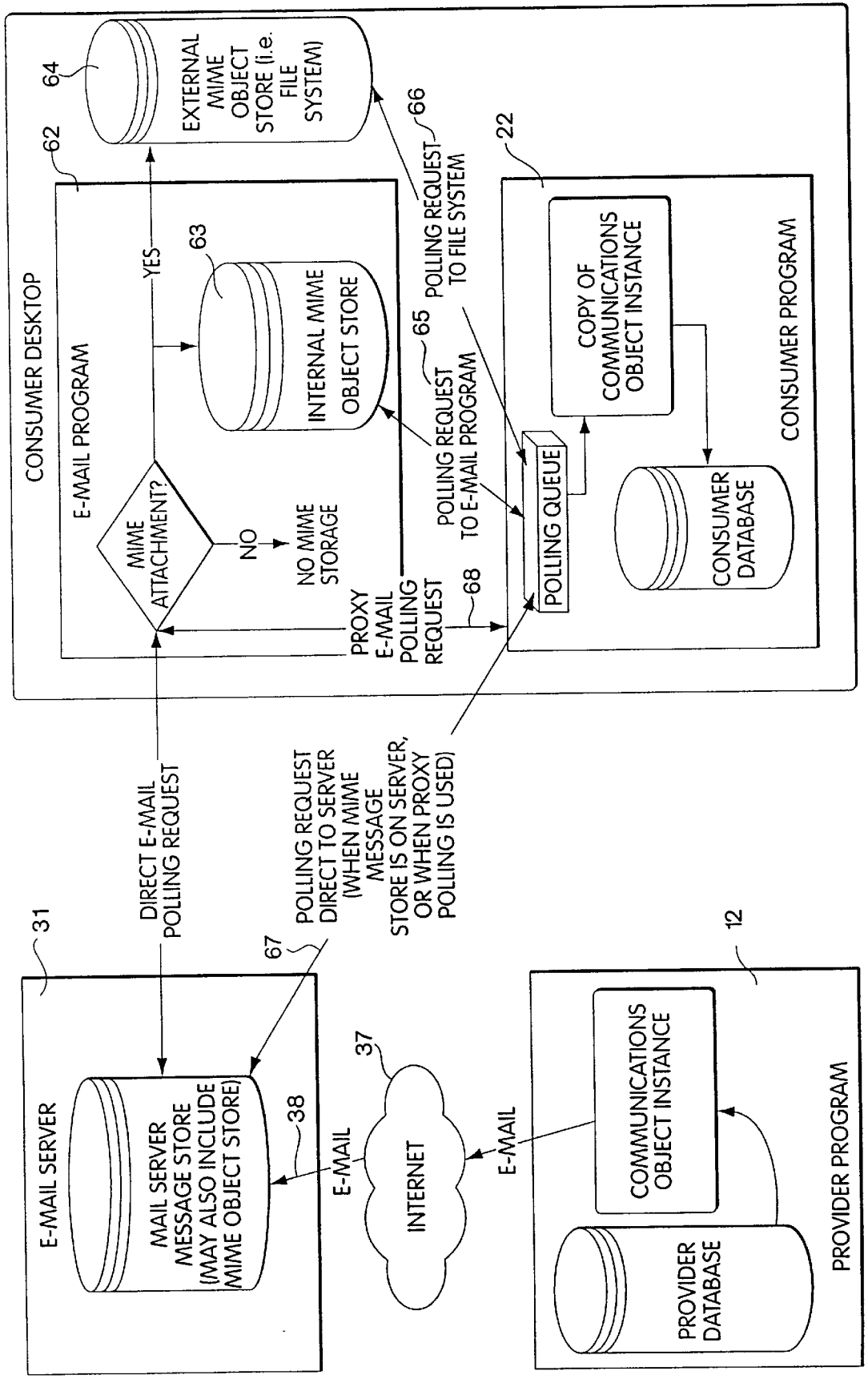
FIG. 8 illustrates a push method of transmission of a communications object.

FIG. 8 illustrates transfer of an object through e-mail using the push technique. The browser program 50 is not used for this function. The object may be attached as a MIME object to an e-mail message 38. Other attachment or encoding types may be used, such as BinHex or UUencoding. The object may also be encoded in ASCII into the text of the e-mail message itself. The optimal encoding method for each recipient can be selected and employed automatically by the provider program 12 when included in the Recipients (120, FIG. 3) class. The transmission steps each attachment or encoding type may vary slightly. The transmission steps for a MIME attachment will be described here. The e-mail message is sent in the ordinary manner, using whichever e-mail servers and intermediaries are available (i.e., through the Internet 37), to reach the consumer's e-mail server 31. The consumer's e-mail program 62 retrieves the mail message from its server in the ordinary manner. Depending upon operation of the e-mail program, the attachment may be downloaded for storage in either an internal or external MIME directory 63, 64, or left for storage on the e-mail server 31. The consumer program then periodically polls the MIME directory 65, 66 or the e-mail server 31 to locate objects of a communications object MIME type. If a communications type object is located, it is read from the storage location and processed by the consumer program as described below.

Alternatively, all e-mail from a server can be filtered through the consumer program 22. In this process, the consumer program 22 acts as a proxy server. The e-mail program 62 polls the consumer program 22, as the proxy server, for new mail 68. The consumer program 22, in turn, polls 67 the e-mail server 31. The resulting mail response is filtered for communications objects directly by the consumer program 22 before being transferred to the e-mail program 62.

Provider Program Operation

As described above, the provider program 12 operates as a state machine in generating HTML screens and forms which are displayed by the user's browser program. The provider program 12 is used to create and edit instances in the provider database 11 of the object classes described above. The provider program 12 is also used to publish and distribute instances of communications objects to the consumer program 22 or distribution server 32 through the communications system 3.

Figure 9:
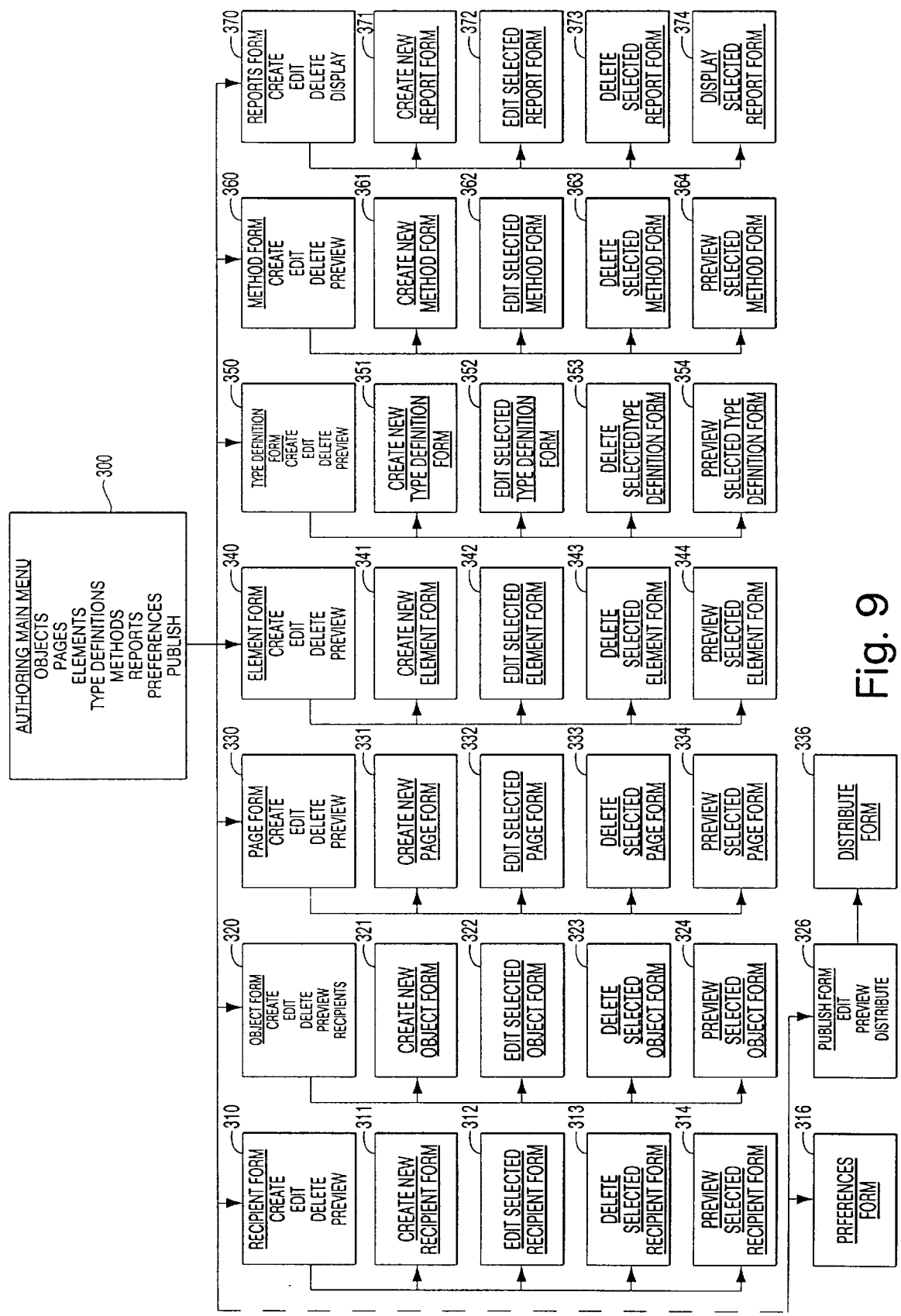
FIG. 9 illustrates operation of a provider program of FIG. 1 according to an embodiment of the present invention.

FIG. 9 illustrates the relationships between various screens and forms produced and used by the provider program. Upon starting, an HTML page of the main menu 300 screen is generated and displayed. If the browser program 50 (FIG. 2) is not currently operating, the provider program 21 starts the browser program 50 and generates a DDE, OLE, AppleEvent, or similar operating system request to start the browser program 50 and have it display the requested HTML page. The main menu 300 screen lists various menu items which are hyperlinks to other HTML pages containing additional menus or forms. The menus and forms discussed with respect to the provider program 22 or consumer program 21 are merely illustrative of the capabilities of the system. The features and functions of the system can be organized in any order or hierarchy within the screen based menu system. Alternatively, another native interface system could provide a substantially different organization. Additionally, other functions and features can be added by creating other menus or forms and creating hyperlinks on the existing menus or forms to those new screens. Furthermore, in addition to specific menus, various choices can be implemented on toolbars displayed on one or more of these HTML pages. In order to satisfy user preferences, many menus, forms, and toolbars can be editable by the user via preference forms or even direct HTML source editing. Such preferences may allow a different default startup menu screen, different toolbars, different menu choices on any given screen, different screen fonts or backgrounds, or other display or operational preferences.

The first five choices on the main menu 300 allow the user to work with the communications objects, pages, elements, type definitions, and methods stored in the provider database. The provider program is primarily creating, displaying, editing, and reporting on objects in the provider database. Therefore, the menus and forms used by the provider program are similar to a the menuing, browsing, editing, or reporting modes of any conventional database application. Initially, there are no user-defined communications objects, pages, elements, type definitions, or methods. (System-defined communications objects, pages, elements, type definitions, or methods may exist which are not editable by the user). Upon selection of one of the menu choices, a HTTP request is generated to display the requested HTML page. The communications object 320, page 330, element 340, type definition 350, and method 360 forms include similar functions: create, edit, delete, and preview. Although the functions are similar, each menu has links to different HTML forms used for performing the functions on the different types of data (communications object 321–324, page 331–334, element 341–344, type definition 351–354, and method 361–364). In addition to the menu choices, a list of the appropriate class instances from the provider database 11 is displayed in order to select the data to edit, delete, or preview. In one embodiment, hyperlinks or form buttons for editing, deleting, and previewing are associated with each data item in the list. Alternatively, a single link to the edit, delete, or preview forms can be used and the data item is selected from a list when that form is displayed.

The create forms 321, 331, 341, 351, 361 are respectively used to create a new communications object, page, element, type definition, or method instance. A form is displayed having entry locations to input the necessary attribute data and create the desired associations. Association choices can be shown as lists of the associated class instances with checkboxes or input fields for each instance. For example, when a new page is created, the page create form 321 that creates a new instance of a page (141, FIG. 3) would include a list of communications objects (110, FIG. 3) to which the new page can be assigned. It would also include a list of elements (142, FIG. 3) that can be assigned to the page. The display order for these elements could be input as numerical values in input boxes representing each reference (144, FIG. 3).

Figure 10A:
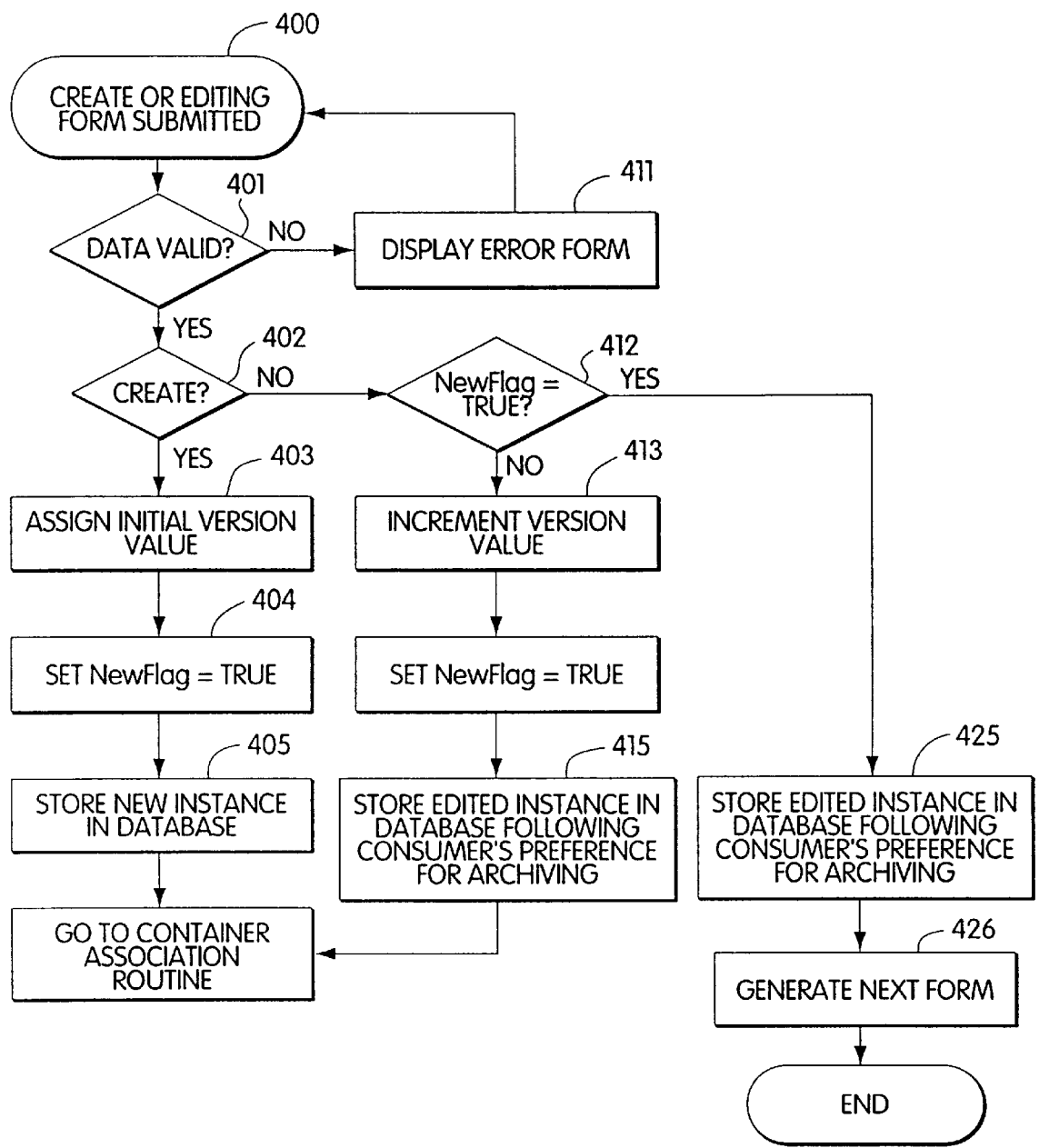
FIGS. 10A and 10B are block flow diagrams of operations of the processes for form submissions and update associations.

FIG. 10A shows the processing steps to be taken upon submission of a create form. These steps also apply to submission of an editing form as described below. When a create form is submitted (step 400), the provider program 12 first determines whether the form data is valid (step 401). If it is not the provider program returns an error screen or form with information about the error to the user (step 411). This error screen may include a form for correcting the error, or hyperlinks to other forms where the error can be corrected. Once a form passes the validation test, the provider program then determines whether the form is a create or an edit operation (step 402). For a create operation, the program next assigns the new instance an initial version value (step 403), sets the instance's NewFlag attribute to TRUE (step 404), and saves the instance to the provider database 11 (step 405). The version value is used to compare changed object class instances in the object reception processing. The NewFlag attribute is used to indicate a class instance that requires distribution.

Figure 10B:
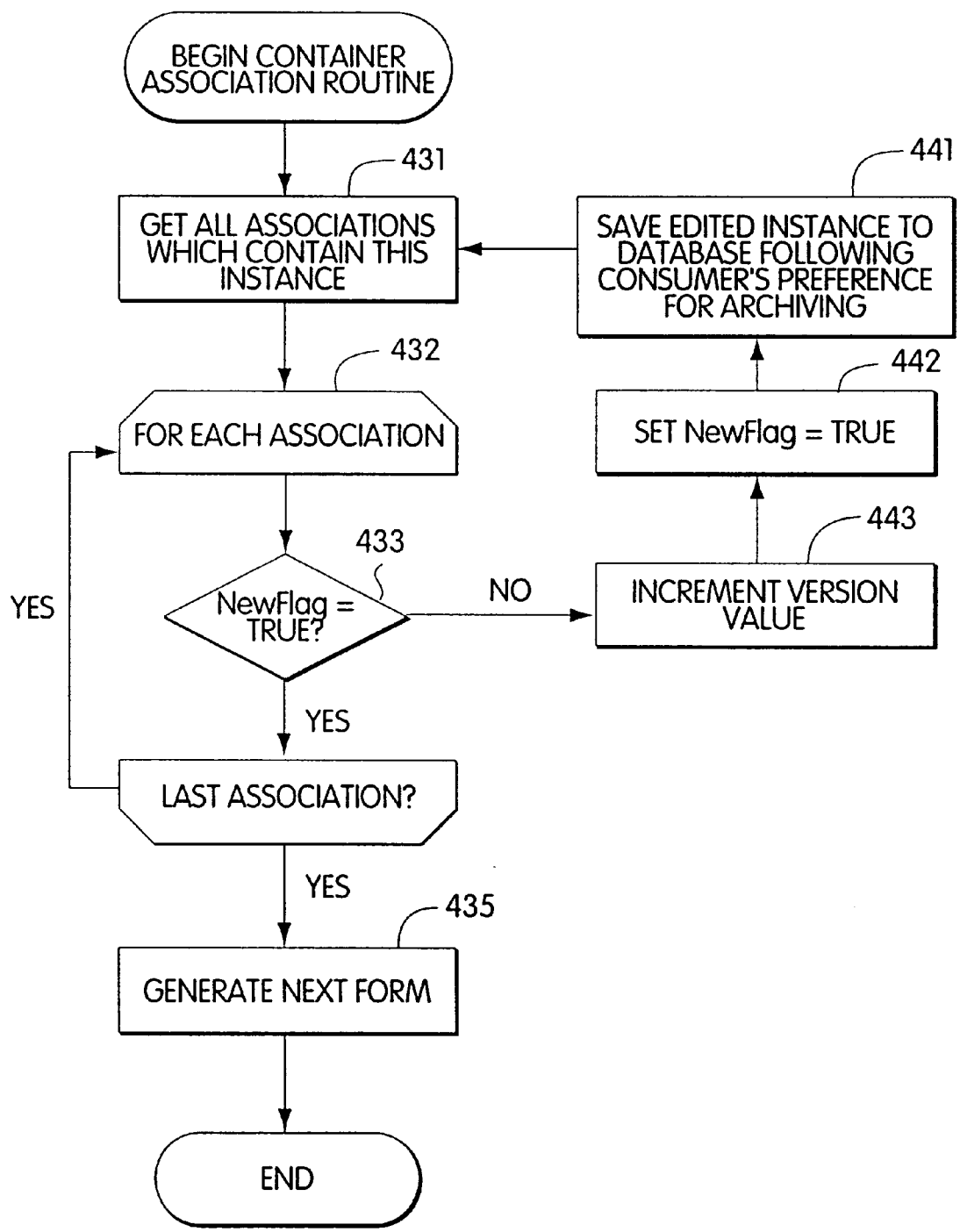

The provider program 12 then calls the container association routine illustrated in FIG. 10B. In this routine, the provider program first gets all associated class instances which contain the newly created class instance (step 431). The program then processes each associated class instance to determine whether it is already identified as a new instance (steps 432, 433). If the associated class instance is not new, the version value is incremented (step 443), the NewFlag is set to TRUE (step 442), and the instance is stored in the provider database 11 (step 441). When an associated class instance becomes new, every container association with this instance must also be processed (steps 431–433). In this way the program process the entire tree of all class instances which contain the newly created class instance, incrementing version numbers and marking them as new. This is necessary to ensure the complete distribution of all associations to any new or changed class instances. When all container class associations have been updated, the next HTML screen is generated (step 435).

The edit forms 322, 332, 342, 352, 362 shown in FIG. 9 permit the editing of instance attributes and associations in the database of the appropriate class. For example, the communications object edit form 312 will list the pages which currently exist in the database and therefore can be assigned to the object. A submitted edit form 322, 332, 342, 352, 362 is processed according to the steps illustrated in FIGS. 10A and 10B. A test for an edit form is performed in step 402. From this point there are only two differences from create form processing. First, if the NewFlag attribute of the edited class instance is already TRUE (step 412), this means the instance has been edited since the last distribution operation. In this case, the container association routine need not be performed; the edited instance can simply be saved to the database (step 425) and the next HTML screen generated (step 426).

Second, edited instances do not necessarily replace the previous instance when stored in the database (steps 415, 425). Multiple versions of object instances may be maintained in the database so that the user can revert to previous data. The number of previous versions stored is controlled by a user preference setting. Once the preferred number of previous versions are already stored in the database, then the oldest version is deleted when a new version is stored.

The delete forms 323, 333, 343, 353, 363 shown in FIG. 9 are used to remove class instances from the database. The form can require confirmation that the selected instance is to be deleted. Additionally, the delete form can provide a list of other instances of the same class in order to allow the selection of multiple items for deletion. Processing of a submitted delete form first involves executing the steps of the container association routine illustrated in FIG. 10B. Then the selected class instance or instances are deleted from the database. Instance deletion may follow the user preference for archiving a specified number of deleted instances, or maintaining deleted instances for a specified interval of time before purging them completely from the database.

The preview forms 324, 334, 344, 354 shown in FIG. 9 provide a display of a selected communications object, page, element, or type definition, or method as it would appear to the consumer, without editing labels or internal naming labels. This is similar to the print preview mode of a word processor. Submission of a completed method preview form 364 executes the selected method to test how it would operate in the consumer program 22.

The recipient form 310 accessed from the object menu 320 is used to assign the recipients (120, FIG. 3) who will receive each communications object. From this form the user can add or delete recipients associations for the selected object by the use of checkboxes for each recipient. The user can also choose to go to four additional forms. The create recipient form 311 allows the user to add a new recipient instance to the database. The edit selected recipient form 312 allows the user to edit the recipient's settings for communications object distribution. The delete recipient form 313 permits the user to delete a recipient from the database. No special processing is required when adding, editing, or deleting recipient instances since they are not a communications object component and there are no associations that contain them. However, NewFlag and HoldFlag attributes for recipients are set as described previously for purposes of communications object distribution. The preview recipient form 314 allows the user to see precisely how any selected communications object and its component pages and elements will appear to a selected recipient.

The reports form 370 is used to create, edit, delete, and display reports (120, FIG. 3) from the database. Menu items link it to the create report form 371, edit report form 372, delete report form 373, and display report form 374.

The preferences form 316 is used to edit the user's overall preferences (GlobalPrefs 114, FIG. 3) for program display and operation.

An object is published by using the publish menu form 326. Publishing refers to the process of reviewing and finalizing changes and initiating distribution. When selected, the publish menu 326 provides a list of communications objects, pages, elements, type definitions, and methods, and recipients which have been changed since the previous publishing operation. The items on the list can be selected, edited, and previewed in a manner similar to that under the respective communications object, page, element, type definition, and method menus. One editing action which a user might typically take at this time is to set the HoldFlag attribute to TRUE. When this is done all other editing changes are preserved but the class instance will be withheld from distribution until the HoldFlag attribute is reset to FALSE. Once the user is satisfied that all the information is correct, the user selects the distribute form 336. This form first provides the opportunity for a final confirmation that the information is ready to be published. It also allows setting of various parameters relating to the distribution process. One such parameter is the date and time the actual distribution operation should occur if it is not to take place immediately. Another parameter is an acknowledgment setting and acknowledgment interval, which are described below. Once the distribute form 336 is submitted, the communications object generation and distribution process is initiated.

Object Markup Language

In order to transfer a communications object instance or object update instance from a provider program 12 to a consumer program 22, the object must be output from the provider database 11 into a format suitable for transport via a communications network 3. Any type of machine readable and writable format could be used, for example a compressed binary file such as that used by most relational or object-oriented database management programs. However, for maximum compatibility with communications networks 3, object instances are output in an ASCII markup language, which is a superset of HTML. As with HTML, or other standard markup languages such as SGML, each item of structured data such as an object class or container class is expressed within a set of delimiters or "tags" defined in the markup language. Certain classes in the database structure exist specifically to provide the necessary container tags for other classes. For example, in FIG. 3 the Methods 130, Pages 131, Elements 132, and TypeDefinitions 133 classes are all special container classes used to provide the tags necessary to delimit the methods, pages, elements, and type definition sections of an object output in the markup language. The use of an ASCII markup language does not preclude additional encoding, such as encryption, for the entire object or portions of the object. Another advantage of the use of an ASCII markup language is that the data and methods contained in communications object may be rendered readable to other data processing programs for purposes of interoperability.

Communications Object Distribution Process

In the communications object distribution process, instances of the communications object (110, FIG. 3) are created and transmitted to the recipients (120, FIG. 3) associated with the object. This processing proceeds in accordance with the instructions on the distribute form (336, FIG. 9.) and the attributes and methods of the recipient (120, FIG. 3). Two different techniques can be used to publish an existing communications object which has been updated. The entire communications object, including all of the changes, can be transmitted every time it is distributed. Alternatively, only the component class instances which have been changed may be sent. The only difference is that in the second technique the distributed communications object only contains the class instances and associations where the NewFlag attribute is set to TRUE. Instances and associations which have not changed are ignored. Therefore, whether the unchanged data is sent to the consumer program is irrelevant. Whether to send a complete object or only changed components depends upon the complexity of the object and the potential for communications objects to become desynchronized due to transmission errors.

Figure 11:
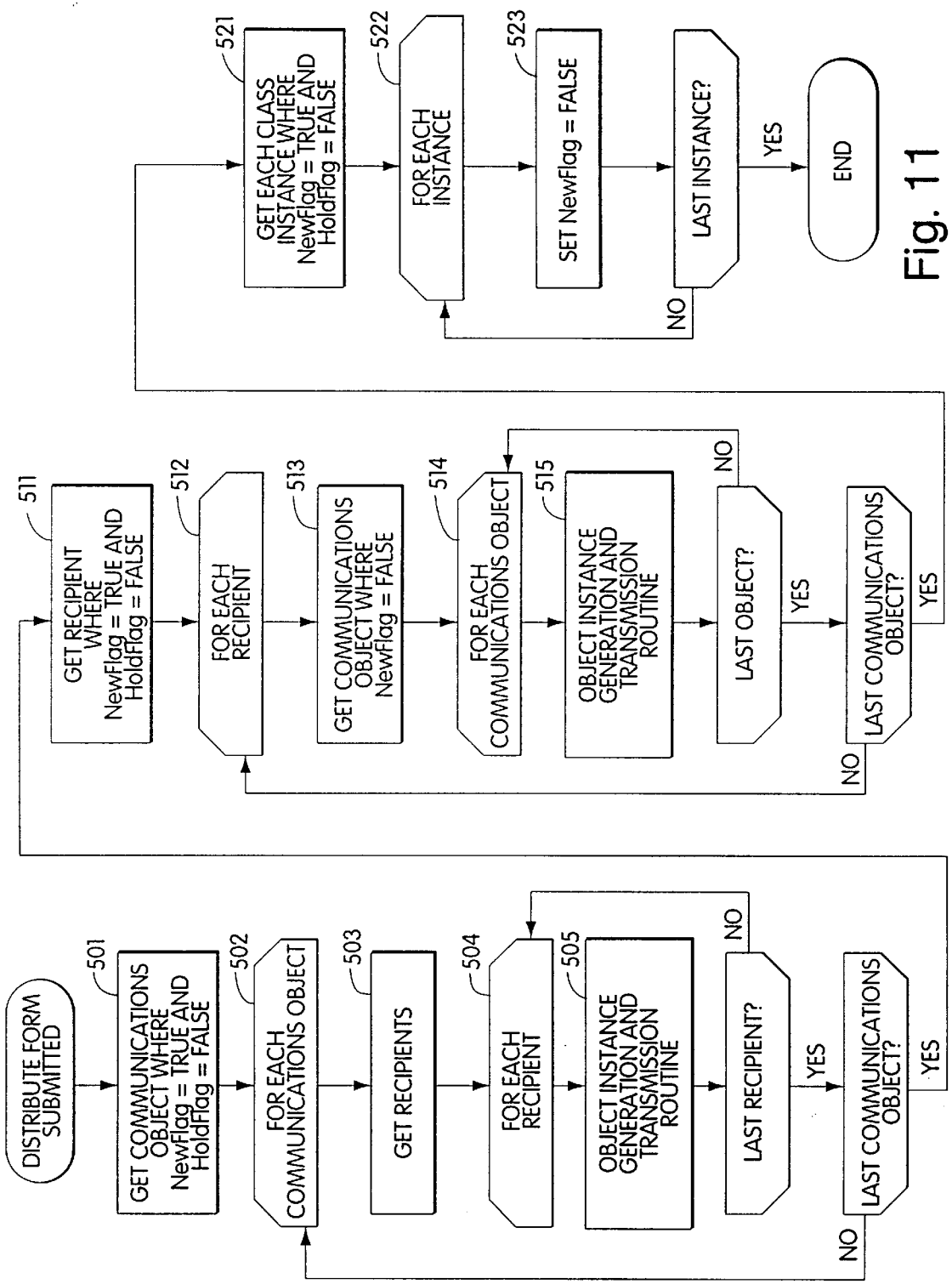
FIG. 11 is a block flow diagram for a process for distributing a communications object.

FIG. 11 illustrates the process performed by the provider program 12 in distributing an entire object. The provider database 11 is queried (Step 501) to determine all new or changed communications objects which need to be published, i.e., those which have a NewFlag attribute set to TRUE and a HoldFlag attribute set to FALSE. The program then loops (step 502) through each communications object instance 100 which is to be published. For each object the program reads the associated recipients 120 (step 503). The program begins a second loop (step 504) through each recipient 120. Using the recipient attributes and methods, a communications object instance is generated and transmitted to this recipient (step 505, further shown in FIG. 12). The loop is repeated for all recipients of the communications object.

At this point all new or changed communications objects have been distributed to their assigned recipients. However, a new or edited recipient may need to receive an existing communications object that has not changed. To account for this case the provider program queries the database for all recipients whose NewFlag attribute is TRUE and HoldFlag attribute is FALSE (step 511). The program then loops (step 512) through each new recipient 120. For each recipient 120, the program queries the associated communications objects 110 for all objects where the NewFlag attribute is FALSE (step 513). The program then loops (step 514) through each communications object 110. Again the object generation and transmission routine is executed for each object (step 515).

After all communications object instances 110 have been transmitted, the program does another query of the database for all class instances where the NewFlag attribute is TRUE and HoldFlag is FALSE (step 521). The program loops through these instances and resets their NewFlag attribute reset to FALSE (steps 522, 523). This prepares the database for the next round of editing and publishing.

Figure 12:
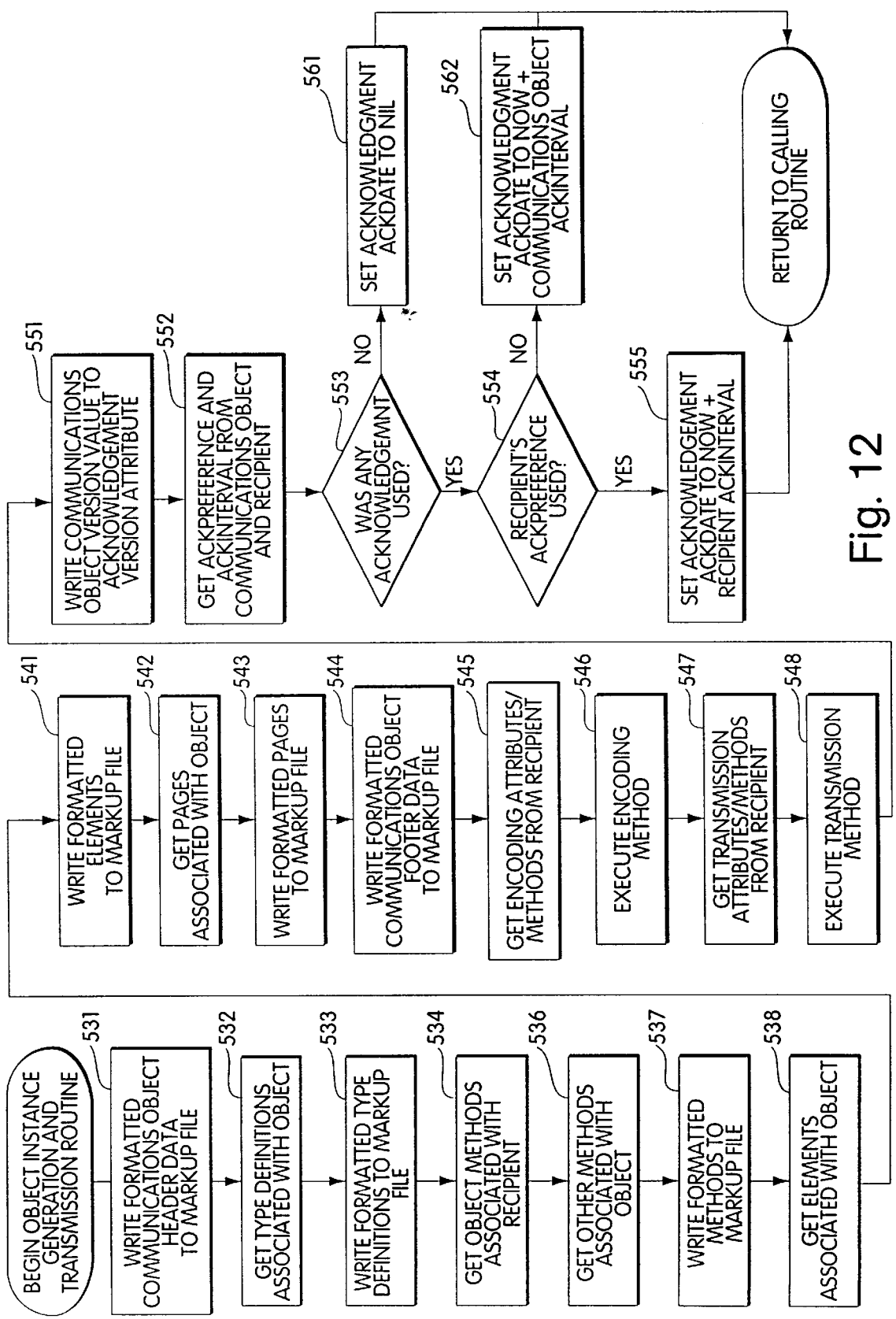
FIG. 12 is a block flow diagram for a communications object generation and transmission routine.

The procedures for generating and transmitting the communications instance for each recipient are illustrated in the flow chart of FIG. 12. The program begins by creating (Step 531) a header portion of an object markup file from the attributes of the communications object (110, FIG. 3). A header portion includes a header tag, the provider's system ID, and any group IDs or classifications (250, 251, 252, FIG. 6), the communications object system ID, and other attributes of the communications object appropriate for transmission. Next, the program reads all type definitions (143, FIG. 3) associated with the object (step 532) and writes them in the markup language format to the markup file (step 533).

The program then gets the communications object's methods (step 534) which are associated with the recipient (120, FIG. 3). Associating methods with recipients allows each communications object instance to use optimal methods for that recipient. An example is update methods. A communications object transmitted to a distribution server such as a Web server would use an update method for pull distribution. A communications object transmitted via e-mail to a consumer would use an update method for e-mail push distribution. Receipt methods are another type of method that typically would vary by recipient. The methods associated with the recipient are written in the markup language to the methods section of the markup file (step 535).

Next, the methods that are associated directly with the communications object are read and written in the markup language to the markup file (steps 536, 537). This process is repeated for elements (steps 538, 541) and pages (steps 542, 543). Finally the necessary footer information is read from the communications object and written in the markup language to the markup file (step 544). The markup file now includes the complete object ready for transmission.

If only changed components of the communications object were to be transmitted, rather than an entire object being resent, only the type definitions, methods, elements, and pages which have changed, i.e., those having NewFlag attributes set to TRUE, would be stored in the markup file. Unchanged pages and elements would be omitted.

The next step is to encoded the communications object markup file for transmission. Encoding attributes and methods are associated with the recipient 120. This allows communications object transmissions to be encoded in an optimal or desired format for each recipient. For example, e-mail recipients who use MIME attachments can receive MIME objects, while e-mail recipients who cannot read MIME can receive BinHex attachments or have the communications object markup file encoded directly in the ASCII text of the e-mail message. Compression, encryption, and other encoding methods can also be applied. The recipients encoding attributes and methods are read (step 545) and the encoding methods are executed (step 546).

After encoding, the communications object is transmitted to the recipient according to the attributes and methods of the recipient (steps 547–548). As discussed previously, according to a preferred embodiment, objects sent directly to consumer computers 2 using the push method are sent as e-mail messages or message attachments to the addresses of the recipients. Objects sent to a distribution server for distribution using a pull method are saved to the appropriate Web server document directory. Alternatively, based upon the access the provider has to the provider's web server, the object could be mailed to the Web server administrator, uploaded as an HTTP form to the Web server, or otherwise stored for later posting by the Web server administrator. The transmission steps could also include an e-mail message, voicemail message, or other notification to the administrator that the object is ready to be stored on the server.

The final set of steps is to record data about the distribution in the acknowledgment class instance (121, FIG. 3) associated with the recipient and the communications object. First, the version value for the object is written to the version attribute of the acknowledgment instance (Step 551). Next an AckPreference value and the AckInterval value are retrieved from both the communications object (110, FIG. 3) and the recipient (120, FIG. 3) instances (step 552). This is necessary because acknowledgment can be controlled at the communications object level, or the recipient level. The acknowledgment setting for the transmitted communications object is carried as a parameter to the receipt method, described below. The distribute form (336, FIG. 9) contains radio buttons for three choices: no acknowledgment, acknowledgment using communications object settings, or acknowledgment using recipient settings. A test is performed on the radio button value to determine if any acknowledgment was selected (step 553). If not, an acknowledgment instance (121, FIG. 3) AckDate attribute is set to a NIL value (step 561) and the routine is finished. If acknowledgment was selected, a second test is performed (step 554) to determine if the recipient settings or the communications object settings were selected. If the recipient settings were selected, the acknowledgment instance (121, FIG. 3) AckDate value is set to the date/time of transmission plus the recipient's AckInterval (step 555). If the communications object settings were used, the AckDate is set to the date/time of transmission plus the communications object's AckInterval (step 562). The AckDate value can now be used by consumer program 22 to check for missing acknowledgments as of the acknowledgment due date as described below. This completes the description of the object generation and transmission routine.

Selective Distribution

When using the push technique, a provider may wish to send different communications object components, i.e., pages or elements, to different recipients. The provider could create different communications objects with different combinations of these attribute components and assign these communications objects to different recipients. However, for a large number of attribute components and recipients, the number of communications objects quickly becomes unwieldy. In a preferred embodiment, the provider can assign communications object components to recipients directly. The attributes for each communications object instance are customized for each recipient during the generation process. This is accomplished in the same fashion as steps 534, 545, 547 of FIG. 12 where object methods, encoding methods, and transmission methods are customized for each recipient by associating them with the recipient instance (120, FIG. 3).

FIG. 3 illustrates the data structures necessary for selective distribution using page associations. While pages are the preferred embodiment shown, other classes such as elements could also be used. Alternatively, additional container classes could be employed, such as page groups. Multiple classes can also be used at the same time. The classes used for selective distribution are not a limiting feature of the invention. In FIG. 3, recipient class 120 and communications object class 110 both have a one-to-many container association with a page subscription class 122. Page subscription class 122 in turn has a one-to-one association with each page instance 141 in the database. Therefore a list of page subscriptions 122 associated with each communications object instance 110 can be displayed on the edit selected recipient form (312, FIG. 9). A SubscribeFlag attribute of each page subscription 122 can be represented as a checkbox on this form. By checking the desired boxes, the user can assign specific pages to the communications object instance that will be transmitted to the recipient.

Figures 13A, 13B:
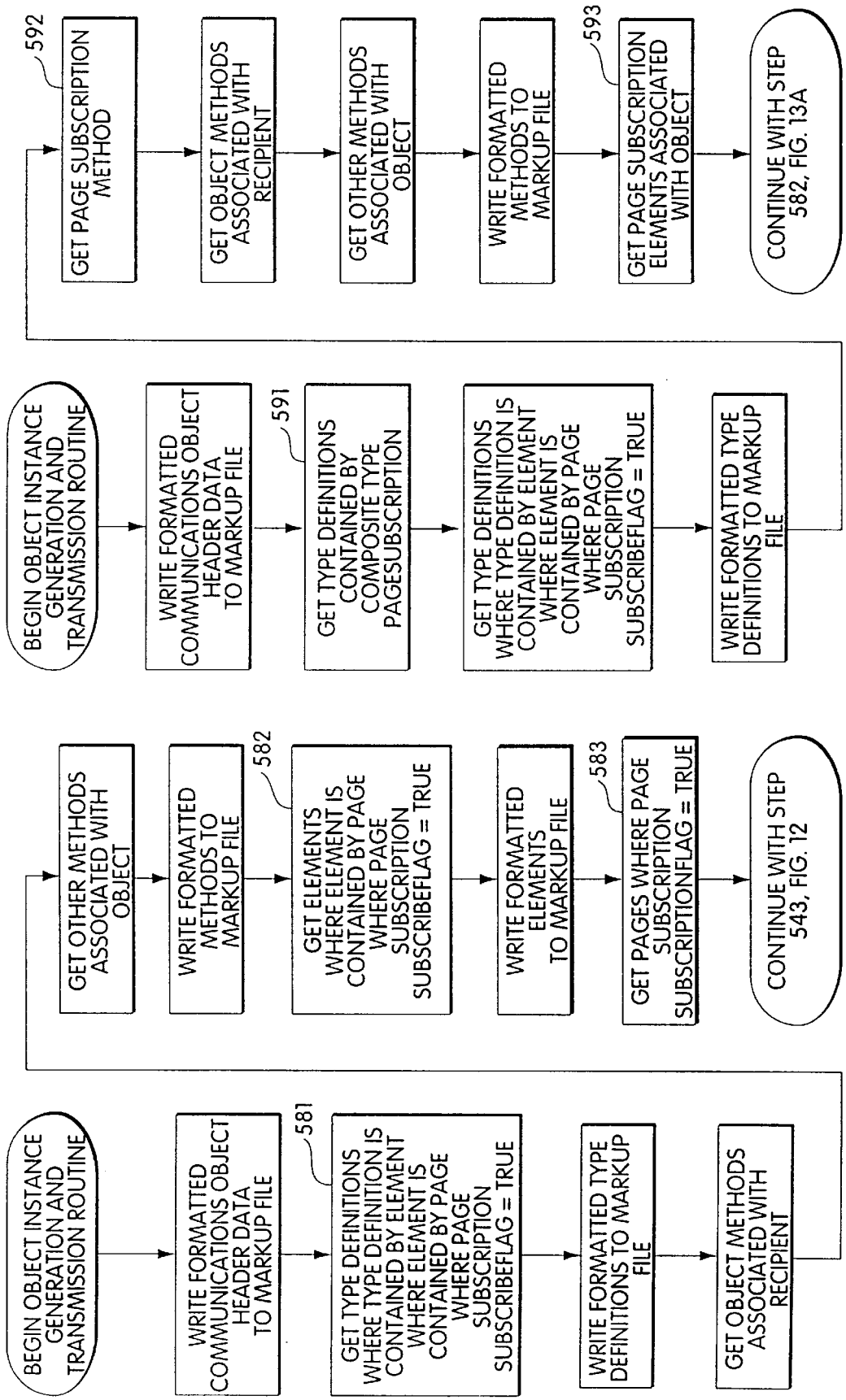
FIG. 13A is a block flow diagram for a process for generating a communications object when selective page distribution is used.
FIG. 13B is a block flow diagram for a process for generating a communications object when selective page distribution and page subscription elements are used.

FIG. 13A illustrates three minor modifications selective page distribution requires in the object generation and transmission process illustrated in FIG. 12. First, in step 581, only those type definitions (143, FIG. 3) associated with elements (142, FIG. 3) contained by pages (141, FIG. 3) associated with page subscriptions (122, FIG. 3) having a SubscribeFlag attribute which is TRUE are selected for inclusion in the object markup file. Second, in step 582, only elements (142, FIG. contained by pages (141, FIG. 3) associated with page subscriptions (122, FIG. 3) having a SubscribeFlag attribute which is TRUE are selected. Third, in step 583, only pages (141, FIG. 3) associated with page subscriptions (122, FIG. 3) having a SubscribeFlag attribute which is TRUE are selected. All other steps are identical to those shown in FIG. 12.

The foregoing process explains how the provider can control selective distribution. However, a provider may wish to allow the consumer to control the selective distribution process. For example, a provider with a large number of pages covering versions of a product may not know which version of the product a consumer is using. Therefore the provider may wish to include a selection menu of these pages in the communications object representing the product. A consumer's choices from this menu are automatically returned to the provider and used to change the consumer's page subscription settings in the provider database 11. In this way the consumer can choose to "subscribe" to the pages corresponding to the versions of the product the consumer uses. This saves transmission time for the provider and file space for the consumer.

For this type of operation, the page subscription class 122 is treated as a special type of preference element to be included in the communications object 110. FIG. 3 illustrates that the page subscription class 122 can have a contained-by association with communications objects 100. The user can edit the PageName and PageDescription attributes of a page subscription instance 122 on the edit selected page form (332, FIG. 9). The user can edit the association of a page subscription instance 122 with a communications object instance 110 using the create object or edit selected object form (321, 322, FIG. 9). This is accomplished by the inclusion of an "Include Page Subscription" checkbox next to the "Include Page" checkbox for each page listed. When the form is submitted with the "Include Page Subscription" checkbox selected, two processing steps occur. First, an IncludeFlag attribute of the page subscription instance 122 associated with the page 141 is set to TRUE. Second, an association is created between this page subscription instance 122 and the selected communications object instance 110.

FIG. 13B illustrates three minor modifications that the inclusion of page subscription elements requires to the object generation and transmission process illustrated in FIGS. 12 and 13A. First, a special set of type definitions (143, FIG. 3) contained by a special PageSubscription composite type definition instance (153, FIG. 3) is included in the type definition section of the communications object markup file (step 591). Second, a special PageSubscription method is included in the methods section. Third, the page subscriptions (122, FIG. 3) associated with the communications object being generated are included in the elements section of the markup file.

As a result of these steps, the desired page subscription elements and the method necessary to process them are transmitted in communications object instance to the consumer. The PageSubscription method is executed by consumer program 22 when the consumer edits instances of page subscription elements 122. The PageSubscription method returns a response message to the provider program 12 containing a new value of the SubscribeFlag attribute for each page subscription 122 as selected by the consumer. The provider program 12 then executes a corresponding PageSubscriptionResponse method which uses the contents of the message to update the recipient's page subscription instances 122. An updated communications object instance can be returned immediately, or at the time of the provider's next publishing operation. Response methods and response processing methods are further described below.

Consumer Program Operation

One advantage of the communications system of the present invention is that the transmitted communications object instance can be automatically received, processed, stored, and indexed by the consumer program 22. Since the data is structured as an object and stored in an object-oriented database 21, the data it contains can be easily searched using the consumer program 22 in order to locate specific information or perform certain functions.

The consumer program 22 may also coordinate with operation of other applications on the consumer computer 2 in order to provide the data to those additional applications. For example, name and address information may be transferred to a personal information management program. E-mail address information can be transferred to an e-mail program for its address book. Similarly, data can be transferred to word processing or spreadsheet programs to be incorporated into documents. Also, the proper information can be used for standard electronic data interchange (EDI) formats or other types of electronic information exchange. Alternatively, the other applications can access the consumer program through an API to retrieve data when needed. These applications can also call the methods of the communications objects to automate data interchange with the provider of the object. This has the advantage of storing the data and methods only once on the consumer's desktop, saving storage space, decreasing complexity, and increasing the accuracy of the resulting communications. The use of an API for communications object access will be discussed below.

Figure 14:
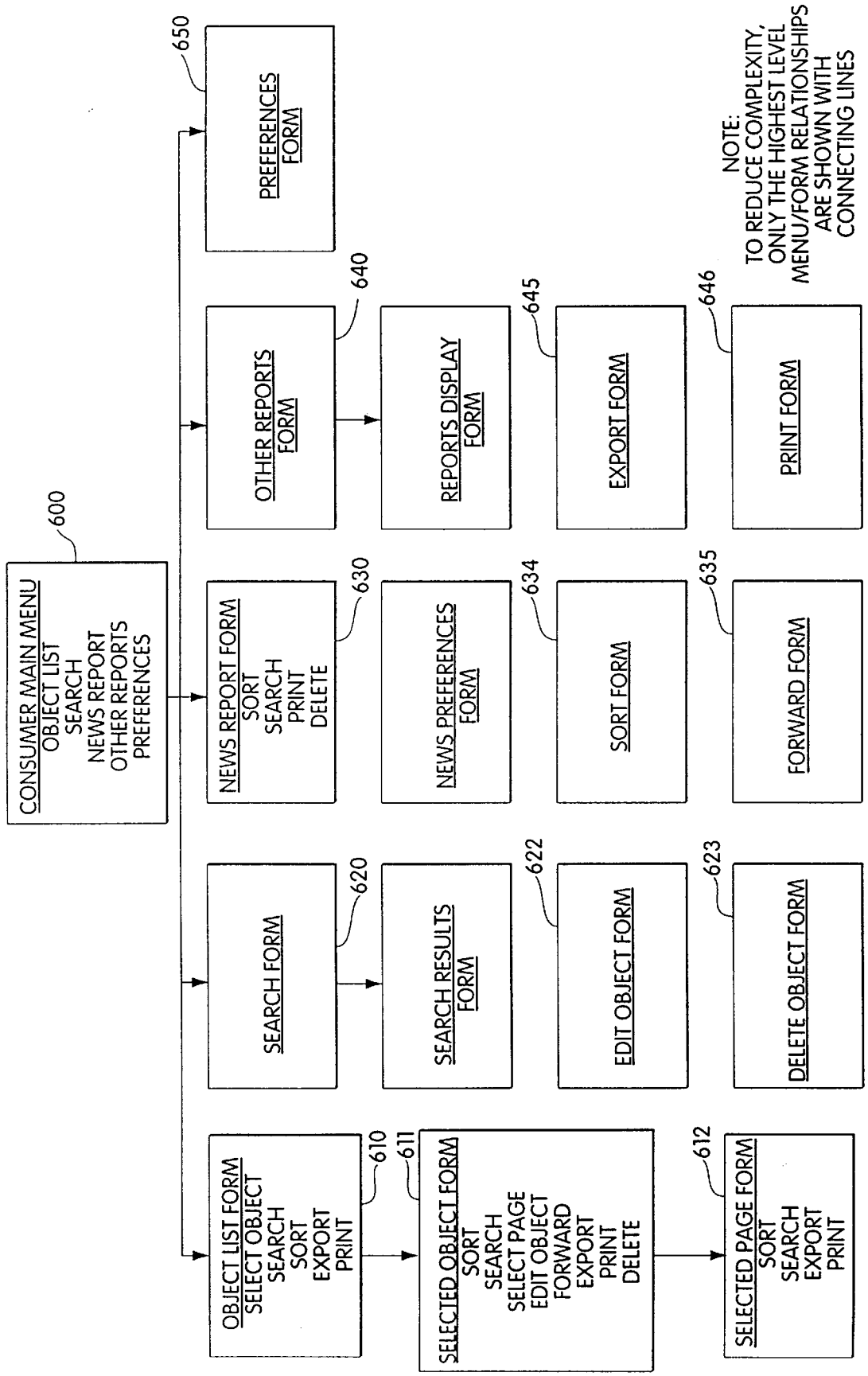
FIG. 14 illustrates operation of a consumer program of FIG. 1 according to an embodiment of the present invention.

FIG. 14 illustrates the relationships between various screens and forms produced and used by the consumer program in processing objects stored in the consumer database. The consumer program is primarily reading, editing, and reporting on objects to the consumer database. Therefore, the menus and forms used by the consumer program are similar to a the browsing, editing, or reporting modes of any conventional database application. Upon startup, an HTML page of the main menu 600 screen is generated and displayed. As with the provider program 12, the menus and forms discussed with respect to the consumer program 22 are merely illustrative of the capabilities of the system. They can be organized in any order or hierarchy, and other functions and features can be added by creating or modifying other menus, forms, or toolbars.

The main menu 600 lists the principal types of functions which can be performed by the consumer program 22. The object list form 610 provides a directory to the communications objects in the consumer database. A name or other identifying information for each object is displayed in a list format. The name or identifying information also functions as a hyperlink to the object. The user can set various attributes of the display, such as formatting of characters, amount and order of information identifying the object, and organization of the communications objects in the list, using the preferences form 650. The choices in the object list menu provide access to forms for performing functions with respect to the attributes or methods one or more communications objects selected in the object list.

Figure 15:
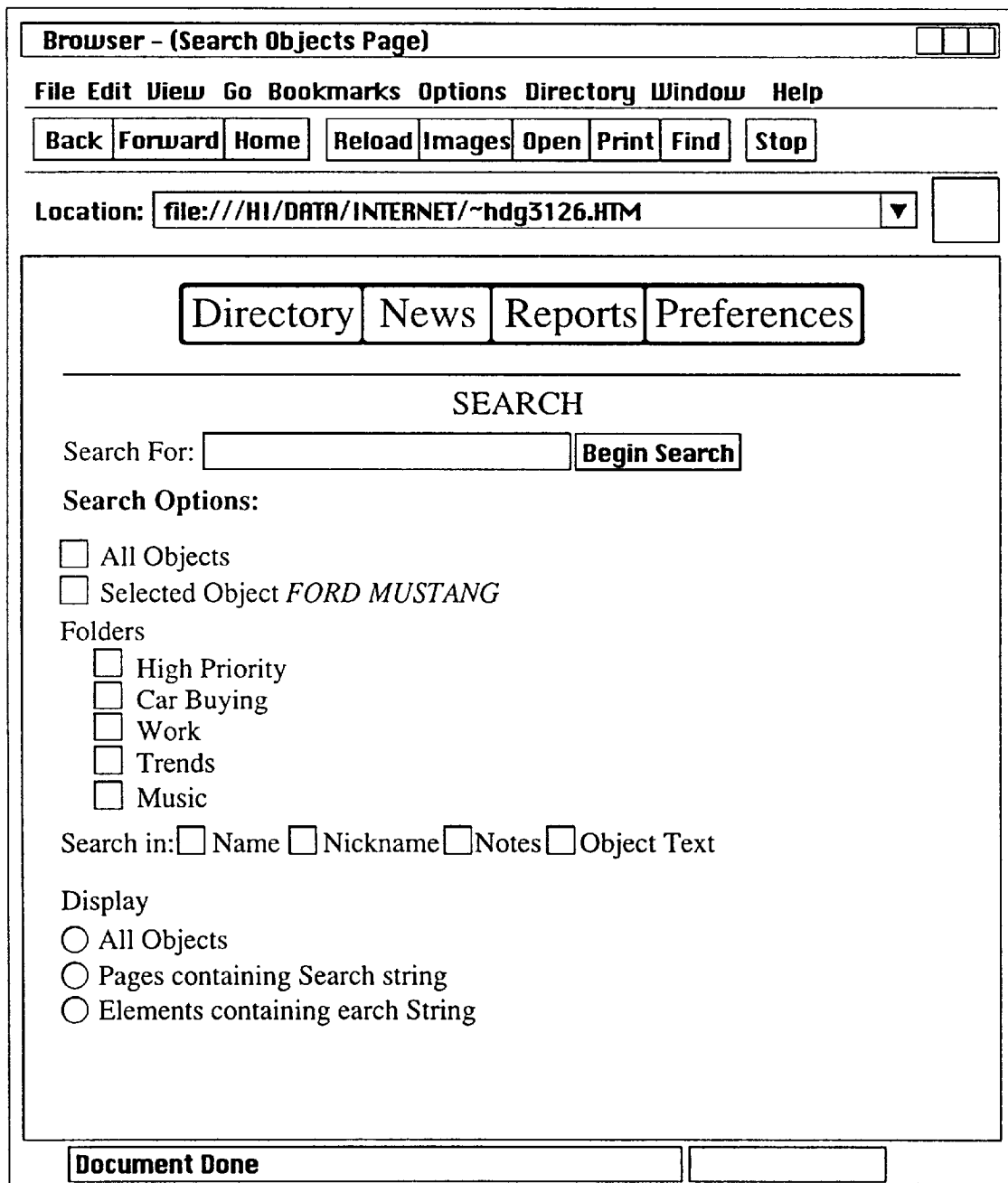
FIG. 15 represents a form for inputting information in conjunction with an embodiment of a consumer program.

The search form 620, as illustrated in FIG. 15, will be used as an example for processing of a form request. The search form 620 presents the user with a screen which allows the input of information, whether typed in or selected as check boxes. As illustrated in FIG. 15 the search form 620 includes a location to enter a search string. The search may also be expanded or limited based upon the form from which the search form was requested. For example, if the search form 220 was selected from the selected object menu 211, then only that selected object is searched. The user may elect to search all objects instead by checking an appropriate checkbox. Similarly, the search can be limited to certain folders of communications objects. The user can also select the method for display of the search results. When the search form 220 is submitted as a request, the consumer program 22 will then act to process the form (step 57 in FIG. 2). The processing of a search form results in a query of the consumer database 21 according to the search attributes entered in the form. The query is performed in the same manner as queries for any object-oriented or relational database. A search report is then generated as the next screen (step 53 in FIG. 2), which is outputted to the browser program 50 and displayed (step 54 in FIG. 2). In the search report, the consumer program 22 will automatically generate a hyperlink URL for each communications object name and page name displayed so that the respective object and page can be selected.

Other functions shown in the object list menu 610 (sort, export and print) operate as forms in a manner similar to that for the search form 620. Selection of the choice causes a URL request for the appropriate form, which is displayed. The user can then complete the information in the form and submit the form for processing. After processing, the next appropriate screen will be generated and displayed.

The sort form 634 presents a set of options for displaying communications objects, pages, and elements. Choices include sorting by container (such as a folder), order (ascending or descending), and unit (object, page, element). The class instances in the consumer database 21 are then sorted according to the selected criteria and redisplayed.

The export form 645 operates to transfer data from the database to be used by other applications, such as a contact file for a personal information manager or a mail merge list for a word processor. First, a search or sort is performed to select a group of communications objects, pages, or elements to be exported. The export form includes choices to select the elements to export, the destination (such as a disk, file, clipboard, etc.) and a format. Upon submission of the completed form, the data meeting the export form criteria is transferred to the selected destination in the selected format. The data can then be used by the other application. A screen identifying the results of the export is then displayed.

The print form 646 is used to print information in the database. Some routine print functions can be performed by the browser program 50. However, other printing functions, such as printing selected elements or pages or using special print formatting, can be performed directly from the print form. The print form requests information relating to the selection of elements to be printed and the format for printing. A results screen can also be displayed after the print operation.

The select object function results in a display of the selected object menu 611. An object may typically be selected by selecting its name on a form, which is hyperlinked to the object. In the selected object menu 611, the names of the pages of the object are displayed in a list, with hyperlinks to each page. From the selected object menu 611, the user can sort, search, export and print using the forms as discussed above with respect to the object list menu 610. Other choices are also possible with respect to the selected object.

An edit object form 622 can be used to edit a communications object's attributes, including its component elements. Most attributes and elements of a communications object are defined by the provider and are not editable by the consumer. However, certain elements are defined by the provider specifically for editing by the consumer. These preference elements may include polling refresh intervals, return receipts, subscription elements, and notification elements. A consumer may also assign other attributes and associations to a communications object. These include folder assignments, nicknames, notes, notification priority, expiration date, and archive method. All communications object attributes and element attributes edited by the consumer are stored separately from the object in the consumer database 21. This is accomplished by use of the CommObjectPrefs class 125 and ElementPrefs class 145 shown in FIG. 3. Whenever the consumer first edits or adds communications object attributes, an instance of the communications object preferences class 125 is created in the consumer database 21 and associated with the communications object 110. Similarly, whenever the consumer first edits a preference element, an instance of the element preferences class 145 is created and associated with the element 142. The edited or assigned attributes are stored in these two classes, and appropriate methods 140 are stored with or associated with these classes (these associations not shown in FIG. 3 due to space limitations). In this way the consumer's data is not overwritten when an updated communications object is received. Additionally, the consumer may forward a communications object without including the consumer's own attribute preferences, although the consumer may optionally choose to do so. Communications object forwarding is described further below.

The delete object form 623 shown in FIG. 14 allows a communications object to be removed from the consumer database 21 if the information is no longer desired. The form also allows the consumer to reconfirm that the selected object is to be deleted. Additionally, the user may select certain options for deletion. Such options may include maintaining the object for a predefined period before actual deletion, or storing basic information (such as an object name, provider system ID, communications object system ID, and update method) so that the object could easily be retrieved again if needed.

The select page option displays the selected page menu 612 which provides a listing of the elements on that page. Typically, the page (141, FIG. 3) would be displayed using the display order attribute of each page reference (144, FIG. 3) as specified by the provider. However, the user may resort the elements using the sort form 634. If a page contains editable preference elements (142, FIG. 3), the HTML rendering of the element on the page would include the input form fields necessary to edit the preference element. It would also include the form processing method name necessary for the consumer program 22 to validate and store the edited element preferences in an element preference instance (145, FIG. 3). The export form 645 and print form 646 can also be used with respect to a selected page or elements on the selected page.

The news report form 630 is selected from the main menu 600 in order to provide information about new communications objects, updates to existing objects, messages received by objects, etc. The news reports form provides the user with the capability to select and filter information received from a provider. Operation of this form is discussed below in connection with notification element processing.

The user can generate other reports relating to the consumer database using the other reports form 640. Standard reports might include database statistics (total objects, pages and elements; database file size; and size of objects being held), object statistics (frequency of use; last use; age in system; total age; size; number of updates; and last update), and transaction logs (number of updates; percentage of CPU time used, online time used; percentage of errors; and types of errors). Additionally, consumers could specify their own database reports to be added to this form.

The preferences form 650 allows the user to edit operational preferences that apply to the consumer database 21 or consumer program 22 as a whole. These can include configuration options such as the initial menu to display upon startup, the colors and fonts for the forms and data, and field defaults. The user may also select options such as a default refresh interval to use for new objects, a default expiration period, and default settings for editing or preference forms.

Communications Object Reception Process

Figure 16:
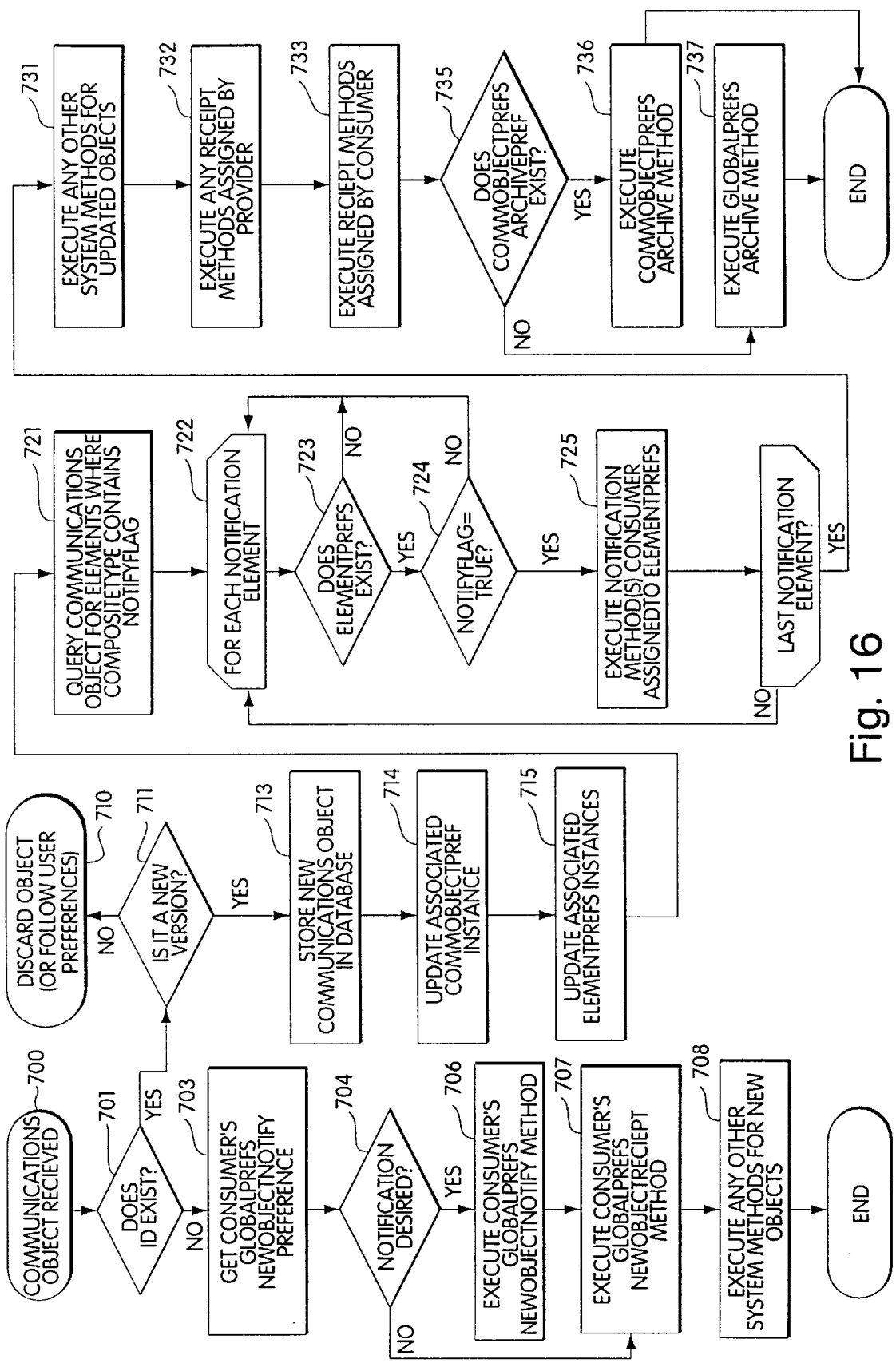
FIG. 16 is a block flow diagram for a process for receiving a communications object.

FIG. 16 is a flow chart illustrating the operations for processing communications object instances 110 received by the consumer program 22. As shown, an entire object is provided (Step 700) to the consumer program 22 each time any changes are made to the object. Alternatively, only the changed portions of the updated object may be sent in an object update. These processing steps for this case are not described but are substantially similar. Upon receipt of the object, the consumer program 22 first determines whether the object already exists in the consumer database 21. This is done by querying the consumer database 21 for the combination of the provider's system ID (100, FIG. 3) and the communications object system ID (Step 701). If this combination does not exist, the object is processed as a new object. The consumers notification preferences for new objects are retrieved (Step 703) from the NewObjectNotify attribute of the GlobalPrefs class (114, FIG. 3) in consumer database 21. A test is done to see if notification is desired (step 704). If so the consumer program 22 retrieves and executes the consumer's GlobalPrefs NewObjectNotify method (Step 706). The user may wish to have the object displayed immediately, to receive an e-mail about the new object, to include a message about the new object including its size, methods, update intervals, etc. in the user's news report, or any other notification action or combination of actions. Notification preferences and methods are described further below. Also, different actions may be taken based upon the program state and operation involved with the object's arrival. For example, the user may wish to have an object displayed immediately if the user manually selected it as a HTTP request from a Web site. However, the user may not wish to have the object displayed if it was an object update retrieved automatically via a Web HTTP polling request by the consumer program 22, or if it arrived via e-mail. Different actions may also be taken based upon attributes or methods of the communications object itself, or a comparison between these and with the existing objects in the consumer database 21. For instance, the consumer may wish to immediately display new objects from selected providers whose system ID is already present, but only have news report notification of new objects from any other provider system ID.

Once the NewObjectNotify method has been executed, or if notification is not desired, the consumer program 22 then executes the consumer's GlobalPrefs NewObjectReceipt method (Step 707). This method allows the consumer to control the processing of new communications objects. Typically this method will store the object to the consumer database 21. However, the consumer may wish to discard objects received from any provider system ID on a list maintained in the consumer database 21, commonly referred to as a "kill file". Additionally, the NewObjectReceipt method controls the permissions the consumer extends to the new object to execute its own receipt method. For example, new objects from providers whose system ID is not in the consumer database 21 may not be allowed to execute their receipt method, while new objects from known providers may be extended this privilege. Receipt methods trigger automatic actions taken when a communications object or object update is first received by a consumer program 22. For example, a receipt method may automatically return an acknowledgment message back to the provider confirming the consumer's receipt of the object or object update. Receipt methods and acknowledgment messages are described below.

After any receipt methods have been executed, the consumer program 22 executes any other system methods that may apply to new communications objects (step 708). For example, a Register method would check to see if the updated object wished to register a new method (140, FIG. 3) in the consumer database 21. Method registration will be described below. After any system methods are executed, new communications object processing is complete.

In step 701, if an object already exists in the database, then it is processed to determine what changes have occurred and what actions should be taken by the consumer program 22 because of those changes. In this way the communications system of the present invention functions not just as an information transfer system but also as an event processing system. Both the provider and consumer share control over the processing that takes place when knowledge of an event is transferred from provider to consumer. The first event, the arrival of a communications object update, is processed in step 711. The version value of the updated communications object 110 is compared with the version value of the most recent version stored in the consumer database 21. The container association routine (FIG. 10B) ensures that any change to any attribute component of a communications object results in the object's version value being incremented. Therefore if the newly received object's version value is not greater than the existing object, the newly received object is not new. In this case other processing, such as notification in the consumer's news report, may take place depending on the consumer's preferences (step 710). Communications objects with equal or lesser values typically represent retransmissions due to distribution errors by the provider, forwarded objects from other consumers, or manual retrievals of objects by the consumer where the update status of the object is unknown.

If the newly received communications object's version value is newer than the last version stored, the consumer program 22 first stores the new object in the consumer database 21 (step 713). If the previous version of the object had an association with a communications object preference instance (125, FIG. 3), this association is updated to the new communications object (step 714). Similarly, the association of each element preference instance (145, FIG. 3) which had been associated with the previous version of the object is updated (step 715). These associations are mapped using the system ID of each corresponding element (142, FIG. 3). If an element for which an association exists is missing, the consumer may wish to be notified. This can be accomplished via the notification report as described below.

The consumer program 22 then proceeds with additional processing steps depending on the contents of the new and old versions. First this means executing any system methods that apply to updated communications objects. System methods may need to be executed in a particular order. One such system method is Notify. Processing of notification elements (steps 721–724) is further described below. After notification processing, the consumer program 22 executes any other system methods, such as the Register method, that apply to updated communications objects (step 731). The consumer program 22 then executes any receipt methods in the object that were assigned by the provider (step 732). Receipt methods are further described below. The consumer program 22 then executes any receipt methods assigned by the consumer, i.e. those contained by the communications object preference instance (125, FIG. 3) associated with the communications object (step 733). Finally, the consumer program 22 checks the archive preference attribute of the communications object preference instance (125, FIG. 3) to see if it exists (step 735). Archive preferences determine the number of previous instances of a communications object stored in the consumer database 21. This is identical to how archiving works for previous versions of communications object components in the provider program 12. For consumers archiving can be controlled globally or by communications object. If the consumer has indicated an archive preference for the object, the consumer program 22 executes the archive method indicated by the communications object preference. If no such archive preference exists, the archive method indicated by the consumer's global preferences (114, FIG. 3) is executed. This completes the processing of a new or updated communications object.

Notification Element Processing

Communications objects automate the communications relationship between a provider and consumer in three ways. First, the communications object allows providers to share information with consumers that is automatically updated when the information changes. Second, communications object updates give providers a means to notify consumers about new events, and consumers a means to filter these event notifications. Third, communications objects give both providers and consumers a means to automate the exchange and processing of other communications between them. Therefore, communications objects transfer both data and metadata from the provider to the consumer. The data is the information of direct value to the consumer. The metadata is the information used to structure and automate the communications relationship.

Notification elements are one of the principal metadata structures of the present invention. Specifically, they are the metadata structure used to automate the capability of the present invention to allow event notification by providers and notification filtering by consumers. Communications objects or object updates can carry multiple notifications elements and message data associated with them. Consumers can also create and assign notification methods to every notification element. The combination of these capabilities provides a powerful means of active messaging.

As described above, notification elements have a special composite type that signals the consumer program 22 to process them with one or more system methods that govern notification of the consumer. FIG. 4 illustrates an example instance of a notification element 202 together with the rest of the inheritance tree for elements 142. The attributes of the notification element instance 202 include the attributes of element class 142, namely system ID, name, description, version, NewFlag, and HoldFlag. Notification element 202 is of a special composite type called NotificationElementFlag, an "on/off" type. This composite type has four fields 152. A NotifyFlag 203, of Logical primitive type, is used to select or deselect notification for this element. The provider can indicate a default setting for this field and the consumer can then edit the setting. Headline 204 and Message 205 are Text primitive types. The headline is entered by the provider to give a short description of the message contents conveyed by the notification element instance. The message provides the principal content. Links 206 is of a TextRange primitive type. Links provide hypertext links to additional information associated with the notification element, such as other elements or pages. Links can also include URLs pointing to related Web pages.

Alternatively, Notification elements may be of other composite types which permit additional functionality to be added to the use of the Notification elements. Specifically, the composite type might include additional fields 152 of an integer range primitive type integer range which allows a notification element to have a "threshold" value in addition to an on/off setting. Thresholds allow providers to add an valuative dimension to news and event announcements. For instance, a notification element about new product announcements could have a range setting of one to five indicating the importance of the announcement. Range-type notification elements allow consumers to create even more effective notification filters based upon threshold levels.

Notification elements are used in the following manner. In the provider program 12, the provider uses the create new element form (341, FIG. 9) to create notification element instances for each information or event topic about which the provider wishes to be able to notify consumers. A list of notification element topics would appear similar to the table of contents for a newsletter, or the topic items on a customer interest survey. The provider inputs a name and description for the information topic covered by the notification element. For example, the name of a notification element for a company selling a software product might be "Version Announcements". If it was an on/off-type notification element, the description might be, "Includes all new version announcements, both minor and major upgrades". If it was a range-type notification element, the description might be "Choose from one to five. One receives only full point upgrade announcements. Five receives all new product announcements, including weekly maintenance patches." Optionally, the provider can also input the initial Headline 204 and Message 205 fields to provide consumers with initial news on the notification element topic. The provider can assign notification elements to one or more pages (141, FIG. 3) which in turn can be assigned to one or more communications objects (110, FIG. 3). The provider may prefer to consolidate notification elements on one or more "news pages", or to intersperse them with other element types on pages.

When the notification elements are transferred to the consumer program 22, the corresponding notification element preference settings are editable by the consumer. FIG. 4 shows an example of an instance of a notification element preference 215. This instance inherited the editable field NotifyFlag from the notification element instance 202. The setting for this field is represented by a checkbox next to the name and description of the notification element 202 when the consumer is editing any form containing the notification element. This could be the selected page form (612, FIG. 14) or the edit object form (612, FIG. 14). The selected page form would present the notification element in the context of the other elements on the page. The edit object form allows all preference elements for the object, including all notification elements, to be edited at once.

When the provider wishes to notify consumers of news related to a notification element, the provider uses the edit selected element form (342, FIG. 9) to edit the headline, message, and link fields of a notification element instance 202. The provider does this for all notification elements for which the provider wishes to transmit news in a particular communications object distribution. Of course any other communications object or object component changes will also be transmitted in the same distribution operation.

The processing of notification elements in an updated communications object received by the consumer program 22 is shown in steps 721–725 of FIG. 16. After the appropriate element preference associations have been updated (step 715), the consumer program 22 queries the updated communications object for each element where the composite type contains a NotifyFlag field (step 721). The presence of a NotifyFlag field signals a notification element. The program then begins a loop through each notification element (step 722). First, it checks to see if an associated element preference instance (215, FIG. 4) exists (step 723). If not, the notification element is skipped. Alternatively, the program could follow an object-level or global-level consumer preference for this case. A preferred way provide notifications of new notification elements is for the provider to include one or more notification elements specifically for this purpose. Updates to these special notification elements can include links to the new notification elements.

For each element where an associated element preference instance exists, the program tests the NotifyFlag setting from the element preference instance (step 724). If the setting is FALSE, the consumer does not desire notification, and the program proceeds to the next notification element for processing. If the setting is TRUE, the program executes the notification methods the consumer has assigned to the element preference instance (step 725).

Notification methods provide the consumer with a powerful mechanism for controlling communications events. Rather than simply maintaining a passive message queue as is typical of most e-mail or voicemail systems, notification methods allow the consumer to specify message processing actions to take upon receipt of an event. The consumer is able to specify such actions because of the metadata provided by the notification element, and because of the structured format of the message data contained in the communications object. Notification methods may trigger any action available to the consumer program 22, subject to the user's permissions.

FIG. 4 illustrates two typical notification methods assigned to the element preference instance 215. A SendE-Mail method 217 causes an e-mail message to be sent to an address or addresses specified by the consumer. Preferably, such a message would use as the start of its header a signifying string such as "News Message:", followed by the Headline text value from the notification element instance. The body of the message would then contain the Message value from the notification element instance. It could also contain the Links values and other details, such as the name of the originating communications object, other actions taken, etc. An AddtoNews method 218 triggers a notification message to appear in the consumer's news report (630, FIG. 14). To set this trigger, the AddtoNews method adds a NewsFlag attribute 216 to the element preference instance 215 and sets its value to TRUE. To display the news report (630, FIG. 14), the consumer program 22 performs a query of the consumer database 21 for all preference elements where the NewsFlag value is TRUE. The actual content displayed in the report is determined by attributes of the consumer's global preferences 114. The consumer may wish to see headlines only and then locate the messages and links for notification elements of interest. Alternatively, the consumer may wish to see all headlines, messages, and links in the news report. The news report may also be sorted according to the settings of the sort form (634, FIG. 14). For example, notification headlines could be sorted by communications object name, communications object nickname, folder, notification priority, date, etc. Each news report entry also includes an input checkbox where the consumer can mark the entry for deletion from the news report. When this checkbox is selected and the news form submitted, the consumer program 22 resets the NewsFlag attribute 216 of the corresponding preference element instance 215 to FALSE.

These two examples are merely illustrative of the actions that can be taken by notification methods. Notification methods may trigger any method operation available to the consumer program 22. Other examples include sending messages to other applications running on the consumer machine 2, sending messages to the consumers operating system to pop up dialog boxes or trigger other system events, and sending voicemail to the recipient. Any combination of notification methods may be used in combination. A particular notification method is not a limiting feature of the invention. Furthermore, other specialized element types can be used for causing various methods to be executed upon receipt of an updated element based upon consumer preferences.

Receipt Methods and Receipt Acknowledgment Messages

As described above, part of the processing that takes place when a communications object or communications object update is received by the consumer program 22 is the execution of receipt methods (steps 732, 733, FIG. 16). In contrast to notification methods, which are assigned exclusively by a consumer, receipt methods can be assigned by either the provider or consumer. Whereas notification methods allow a consumer to trigger processing based on specific events contained within a communications object, receipt methods allow either providers or consumers to trigger processing based on the general event of a communications object or object update being received by the consumer program 22.

As with notification methods, receipt methods may trigger any method operation available to the consumer program 22, subject to any permission restrictions imposed by the consumer. A typical example of a receipt method assigned by a consumer is a forwarding method, which is described below. A typical example of a receipt method assigned by a provider is a receipt acknowledgment message return. As shown in FIG. 1, this is a message 33 returned by consumer program 22 to provider program 12 via a communications network 3 available to both provider and consumer. This message acknowledges the consumer's receipt of the communications object or object update. Acknowledgment messages can contain structured data which can be automatically processed by the provider program 12. For example, a receipt acknowledgment message can contain the system ID and version value of the communications object received by the consumer; the name of the response processing method to be executed by the provider program 12 when the receipt acknowledgment message is received; the system ID (recipient ID) of the consumer program 22 which received the object; the date/time the object was received; and a status flag indicating whether the object was received successfully. When this message is received by the provider program 12, it can be automatically processed by the named response processing method to update an AckFlag value of the acknowledgment instance 121 associated with the communications object system ID and recipient system ID provided in the message. Receipt acknowledgment messages can also contain other data or instructions to the provider program 12. For example, the consumer may decline to accept the communications object. In this case the receipt acknowledgment message could notify the provider of this event or delete the recipient's 120 association with the communications object 110 so the consumer would no longer receive the updates. Receipt acknowledgment messages are a special case of response methods described below.

Update Methods and Polling Control

Communications objects are typically associated with at least one update method. The update method may be of the push technique, or of the pull technique, or a combination of both. A communications object may also be associated with multiple update methods. As with any other object method, an update method may be a reference to a system method, an method carried internally in the object, or a call to a remote method stored on another computer accessible via communications network 3. When a communications object instance is distributed using the push technique, updates are pushed by the provider program 12 and not pulled by the consumer program 22. Thus the update method may not be active in the consumer program 22. However, an update method may still be employed in this case for error correction. For example, if the provider typically distributes communications object updates via the push technique every 30 days, the provider could specify that the communications object's update method send an error message if no update is received by a consumer for 60 days. This message could contain the communications network address of the consumer computer 2, the version and date of the last communications object received, and other such data as would allow the provider program 12 and consumer program 22 to resynchronize after an error condition.

When a communications object employs the pull technique of updating, the update method is required to control the update operation. Pull-type update methods can use any services available at the consumer program 22 to initiate an update. In a preferred embodiment shown in FIG. 1, updates initiate a polling request from the consumer program 22 to the distribution server 32. This polling operation can be a simple as issuing a Web server HTTP file date request for the communications object markup file 35. The consumer program 22 then compares the file date returned with the file date of the last update, stored as the LastUpdateDate attribute of the communications object (110, FIG. 3). If the date of the file 35 stored on the Web server 32 is newer, the consumer program 22 then issues an HTTP request to get the communications object markup file 35, and processing begins as shown in FIG. 16.

The triggering of update methods is typically controlled by a system event in the consumer program 22. Alternatively, it could be triggered by the receipt of an update trigger message from the provider program 12. The timing of the system event is controlled by one or more preferences stored in the consumers global preferences instance (114, FIG. 3). Thus, the system event could happen upon startup of the consumer program 22, at a periodic interval during the programs operation, at a specific time of day, etc. The system event could also be dependent on monitoring the system activity level of the consumer computer 2, or on other system or environment variables. Alternatively, the system event can be manually initiated by the consumer. The system event would send an update message to all communications object instances present in the consumer database 21. Each communications object then executes its update method to see if an update operation was necessary. For those pull-type update methods which use polling, the system's attributes and methods together with the communications object's attributes and methods provide a variety of mechanisms to make polling decisions. Polling can be controlled by a direct time interval attribute of the communications object, for example 14 days. As described above, this interval can also be set by the consumer using a preference element, wherein the provider establishes a minimum and maximum interval between which the consumer can choose. Polling can also occur on specific dates and times, as specified either by the provider or consumer or both. The polling decision can also be based on other calculations, such as the total age of the communications object in the consumer database 21; the frequency with which the consumer has viewed or acted upon the communications object; costs or fees associated with an update; or other criteria. The specific method for controlling update polling is not a limiting feature of the invention.

Combined Provider and Consumer Program Operation

The functions of provider and consumer have been separated in the above discussion in order to simplify the description of the communications system of the present invention. However, in one embodiment, the functions and databases are combined. Thus, a single database includes all of the communications objects and object components which were created or received by the user. This eliminates complexity and saves disk space for the user. Combining the functions and databases also yields considerable additional functionality.

First, the communications relationship is synchronized between two users. As shown in the object classes illustrated in FIG. 3, a recipient instance 120 can be associated with a communications object 110 that originates from that recipient. The user only needs to establish this association once. The communications object can include an element 142 of a special composite type ReceiveObject, which contains the fields necessary to supply the attribute values of a recipient instance 120. The encoding and transmission methods associated with recipient instance 120 can also be obtained from the methods contained by or associated with the recipient's communications object 110. In this way, the provider no longer needs to maintain the attributes or methods of the recipient instance 120. They are updated automatically when updates to the recipient's communications object 110 are received.

To further automate the synchronization of this relationship, a communications object 110 can contain a receipt method, "AutoExchange", which causes the consumer program to automatically generate a recipient instance 120 for the provider of the object, and to execute any AutoExchange methods based upon user preferences. In one method, a designated communications object is returned automatically to the provider of the originally received object. Alternatively, a preference element 145 can be generated for inclusion in the receiver's news report. The news report message could be linked to the recipient instance 120 for the provider. In this way the receiver could quickly select the communications objects and pages to return to the provider.

In some cases the originator of a communications object may not wish to receive a communications object in return. For example, a large print publication may wish to provide a communications object from which it only desires to receive only change-of-address notices from users who subscribe to the publication. This can be accomplish through the use of a SelectiveExchange method. When a communications object containing a SelectiveExchange method is received for the first time, the receiving program automatically creates a recipient instance 120. Next, it associates the SelectiveExchange method with this recipient. For a SelectiveExchange method covering changes of postal addresses, it would also prompt the user to select a particular element of composite type PostalAddress to associate with the recipient instance 120. At the very start of the object generation and transmission process (FIG. 12), the transmitting program first tests the recipient instance 120 for the presence of a SelectiveExchange method. If present, the transmitting program executes the SelectiveExchange method rather than the standard the object generation and transmission process. In the case of a change-of-address notification, the transmitting program would first test to see if the associated PostalAddress element had been updated. If not, the update would be skipped. If it had changed, the SelectiveExchange method could return a message to the provider with the specific data necessary to update the provider's subscription database.

A combined database also allows users to include elements, pages, type attributes, or methods from other received communications objects in the user's own communications objects. In creating an object, the provider does not need to create all of the elements. Elements which have been received from others can be used in any object. The same process would apply to pages. Therefore, an object can include information received from other sources. The information will be automatically updated if an changed object is received from the original source, and the updated object can then be distributed.

Forwarding and Chaining

Another significant capability of the communications system of the present invention is forwarding. The forwarding operation allows the user to forward a received communications object to another consumer computer 2. This is accomplished by the use of the forward form (635, FIG. 14). The forward form allows the user to manually input the e-mail address for a recipient. Alternatively, the user can select the recipient from a list of recipients (120, FIG. 3). In this case, the recipient instance 120 contains the necessary information to encode and transmit the communications object. The object is then forwarded to that recipient in a manner similar to a push by the provider. However, certain additional information is included in the object when forwarded. The system ID of the consumer database 21 which forwards the object is identified, as well as the original provider. Also, a receipt method is added to the object which designates how the receiving program should update the object.

Updates can be received from the original provider, or from the consumer doing the forwarding. If from the original provider and the push method is used for updating, then a receipt acknowledgment message is returned from the second consumer to the original provider indicating that the second consumer is to be added to the provider's recipient instances 120. If updates are to come from the provider and the pull method for updating is used, then no special receipt action is necessary. If updates are to come from the first consumer and the push update method is used, then the first consumer may optionally wish an acknowledgment message to be returned. In essence the first consumer is now operating like the object's provider. A consumer can manually forward updates, or automatically forward them. To automatically forward them, the consumer simply associates a Forward receipt method to the communications object being forwarded. In this way any update received will automatically be forwarded to the recipients 120 associated with this object. Automatic forwarding, or "chaining", is a powerful means of distribution communications object updates, because it spreads the load for distributing objects throughout the communications network. This makes the push method more practical for large-scale distribution.

Response and Response Acknowledgment Processing

Once a communications object has been received by a consumer, it can contain two general categories of metadata and instructions that can automate the consumer's communications with the provider. The first category is notification elements and notification methods, which as described above are used to automatically process communications object updates received by the consumer. The second category is response elements and response methods, which are used to automate the processing of communication messages originating from the consumer back to the provider. Response methods may be triggered manually by the consumer, or automatically by a system event. Receipt acknowledgment messages described above are an example of a response method triggered automatically by a system event, namely the receipt of a communications object or object update.

A common example of a response method triggered manually by a consumer is a response element that includes an HTML form created by the provider. The composite type (153, FIG. 3) for the response element that defines this form includes a special element of composite type ReturnForm. The ReturnForm element composite type contains the field instances (152, FIG. 3) necessary to control the return of the form data. These fields would include the name of the form; the method to be used to return the form; the communications network address to be used (e.g. e-mail address or HTTP URL); the response processing method to be executed by the provider program 12 when the form is returned; and any encoding methods that should be applied to the returned form. When a response element containing a ReturnForm composite type is displayed on an HTML page by the consumer program 22, it is rendered as a standard HTML form. One importance difference, however, is that if the response element can include other special element composite types (153, FIG. 3) which automates the entry of data into the form prior to its display to the consumer. For example, an element of composite type IncludeHomeAddress could automatically add the consumer's home address element. Because the provider and consumer databases 11, 21 will typically contain common communications data pertaining to the respective user, a significant percentage of the data required by routine business and commercial transactions can be automatically transferred in this manner.

When the form is submitted by the consumer, the consumer program 22 uses the values in the ReturnForm element to call the appropriate method for returning the form, including any method contained in the communications object, or a remote procedure call. The identified method is used to structure, encode, address, and transmit the form data back to the provider. One specific example of the encoding that can be applied is the use of public key encryption. If the ReturnForm element includes the provider's public key, the ReturnForm method could use the key data to apply a suitable public key encryption algorithm to encrypt the message.

When the transmission containing the form data is received by the provider program 12, the transmission can indicate the system ID of the originating communications object. It can also indicate the name of the response processing method associated with this object which can be used to automate the processing of the form data for the provider. In this manner providers can achieve a high degree of communications automation.

The same process applied in reverse may also be used to automate acknowledgment tracking by the consumer program. If a consumer transmits a response, either through submitting a form or an automatic response, for which an acknowledgment of receipt is to be sent by the provider, an Acknowledgment method can be associated with the communications object. As with update methods, acknowledgment methods are triggered periodically by system events to check for missing acknowledgments. If the acknowledgment is not received, the method can take other necessary actions, such as retransmitting the response or notifying the consumer via the news report or other notification methods.

Method Servers

Figure 17:
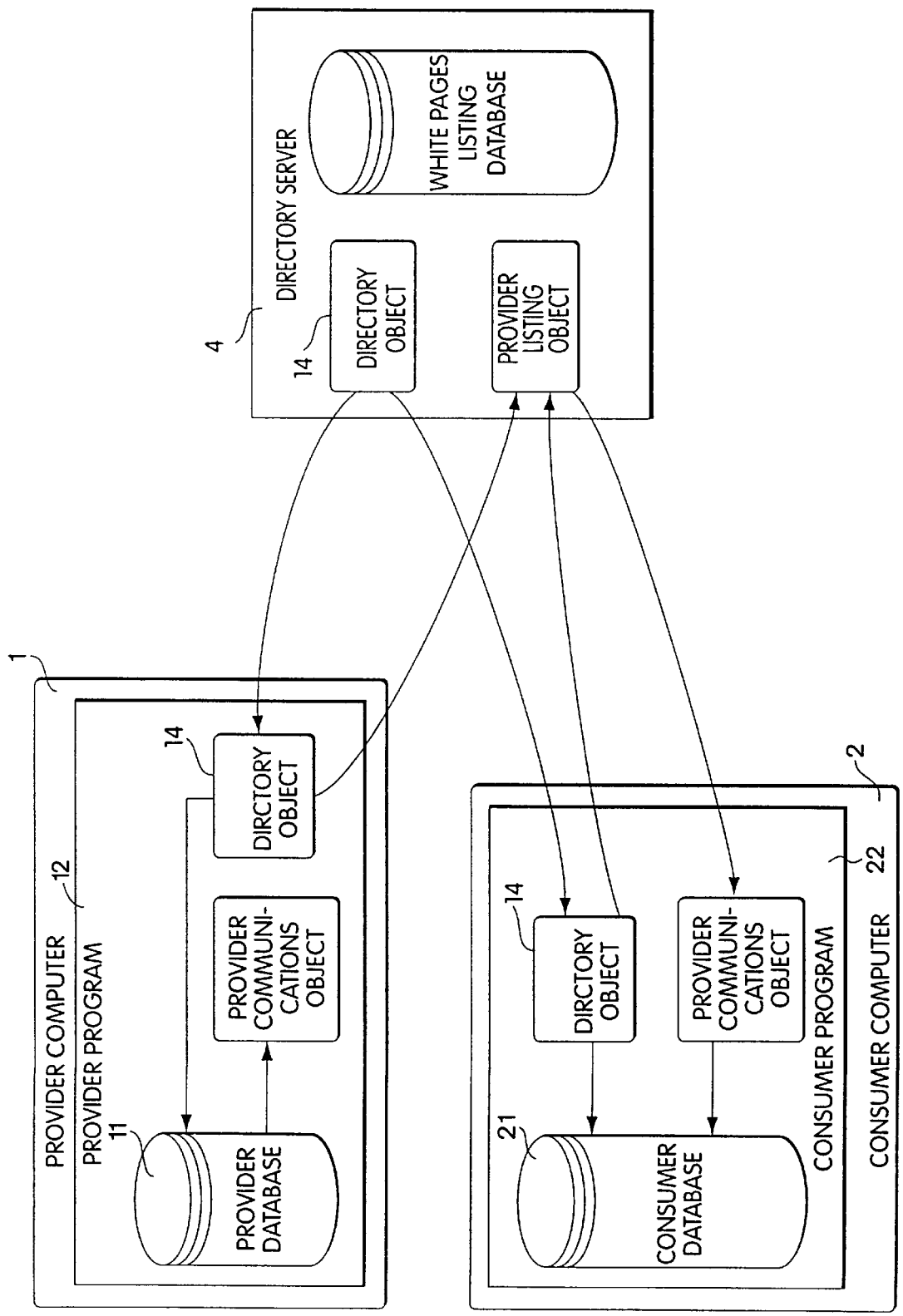
FIG. 17 illustrates method servers in conjunction with the communications system of the present invention.

When a single database is used, the use of elements from other sources creates the possibility of specialized servers which provide a common repository for certain types of objects, or a source for certain types of methods. FIG. 17 illustrates the structures for the communications system including a method server, in this case a directory server. The provider computer 1 and the consumer computer 2 are both connected through the communications network 3 to the method server 4, so that they can both send objects to and receive objects from the method server 4. A communications object 14 from the method server is stored in the provider and consumer databases 11, 21 for both the provider (as recipient) and the consumer. The provider can then access the method server object to include methods in its objects, or to respond to the method server. Similarly, the consumer can access the method server object to respond to the method server and access information at the method server.

For example, a directory server can receive and index communications objects from various providers so that they can be easily located by consumers. To access the services of the directory server, the provider merely needs to download a copy of the directory server communications object. This object now serves the provider in two ways. First, by designating the object as a recipient (120, FIG. 3) for any communications object produced by the provider, the provider can automatically maintain a listing on the directory server. As with any communications object relationship, this listing will automatically be updated whenever the provider's information changes. Second, a link element for this directory server object can be included in the provider's communications object. By selecting this link a consumer can instantly download the directory server object and use it to search the directory server.

In addition to a straightforward "White Pages" listing of communications objects by name, a directory server can serve as a "Yellow Pages" by offering providers categories in which to list their communications objects. This makes it easier for consumers to locate objects of interest. In this case each category on the directory server can be represented by a category object. In the same fashion as a White Pages server, the provider downloads category objects to obtain listings in the categories on the directory, and optionally includes links to these categories in the provider's communications objects. Consumers then use these links to access the category objects for searching, or obtain the category objects directly from the directory server. The use of communications objects to represent the categories has the additional advantage of automatically notifying providers when category names or structures are changed, and of notifying consumers when new listings appear in categories.

Applications Programming Interface (API)

Communications objects encapsulate communications data, metadata, and methods for automating communications with the provider of the object. Additionally, these sets of data, metadata, and methods are automatically maintained by the communications system of the present invention. Therefore, the databases 11, 21 of communications objects represent an attractive central repository for any communications data that must be maintained by the provider or consumer on its computer or on a local area network to which those computers are connected. To access the data, metadata, and methods of these communications objects stored in this repository, an applications programming interface (API) is used. An API defines the methods and method parameters that are used to request services from another application within a desktop or network operating environment.

When the provider and consumer programs 12, 22 include an API, other computer applications can be relieved of the burden of storing, indexing, and maintaining communications data. For instance, the consumer does not need separate address books for a personal information manager, a network directory, and an e-mail program. Other applications automate communications operations using the API. For example, a word processing program calls the data and methods of a particular communications object to automatically save a document in a preferred format, encrypt the document with a public key, address an e-mail message, attach the document to the message in a preferred encoding method, and finally add specific data to the transmission message to allow the recipient to control notification and decoding of the received message.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A computer-based communication system comprising:

a provider memory storing information;

a consumer memory;

association means for creating metadata and storing said metadata at said provider memory, said metadata describing association with at least a portion of said information and defining a control structure which is processed at least at the consumer memory to define a process for determining an update of an associated portion of said information in the provider memory associated with said control structure and for controlling communication of said associated portion to said consumer memory when said associated portion is updated;

transfer means for transferring and storing a copy of said associated portion and said control structure, from said provider memory to said consumer memory;

update determining means for processing said information, including said control structure, to determine when said associated portion in said provider memory has been updated;

transfer control means for processing said information, including said control structure, to transfer a copy of said associated portion from said provider memory to said consumer memory when said update determining means determines that said associated portion has been updated.

2. The computer-based communication system of claim 1, wherein said update determining means includes:

versioning means for storing a first version value of a last update of said information in said provider memory;

comparison means for comparing a second version value of said associated portion previously transferred to said consumer memory with said first version value of said last update information.

3. The computer-based communication system of claim 1, wherein said control structure is associated with a communications network server address and polling control data, and wherein said control structure includes an association between said communications network server address, polling control data, and said associated portion; and wherein said transfer control means includes:
   - (a) polling trigger means for processing said polling control data to trigger update processing at the consumer memory based upon the process defined by the control structure,
   - (b) instruction retrieval means for retrieving transfer instructions from said consumer memory based upon said polling control data,
   - (c) access means for accessing a server at said communications network server address to request transfer of a copy of said updated information according to the transfer instructions retrieved from said consumer memory, and
   - (d) reception means for receiving said updated information transferred by said server in response to a request and for storing said updated information in said consumer memory.

4. The computer-based communication system of claim 1, wherein said control structure is associated with a communications network address associated with said consumer memory, wherein said metadata includes an association between said communications network; and wherein said transfer control means includes:
   - (a) instruction retrieval means for retrieving, based upon the process defined by the control structure, transfer instructions associated with said information from said provider memory,
   - (b) transfer means for transferring a copy of said associated portion to said communications network address according to the transfer instructions retrieved from said provider memory as updated information,
   - (c) access means for accessing, based upon the process defined by the control structure, said communication network address from said consumer memory to retrieve said updated information, and
   - (d) reception means for receiving said updated information transferred from said communications network address and for storing said updated information in said consumer memory.

5. The computer-based communication system of claim 1, wherein said control structure includes a communications network casting address, and wherein said control structure includes an association between said casting address and said associated portion; and wherein said transfer control means includes:
   - (a) provider instruction retrieval means for retrieving, based upon the process defined by the control structure, transfer instructions associated with said associated portion from said provider memory,
   - (b) transfer means for transferring said associated portion to said casting address according to the transfer instructions retrieved from said provider memory as updated information,
   - (c) consumer instruction retrieval means for retrieving based upon the process defined by the control structure said transfer instructions associated with said associated portion from said consumer memory,
   - (d) monitoring means for monitoring said casting address from said consumer memory to retrieve said updated information based upon said transfer instructions, and
   - (e) reception means for receiving said updated information from said casting address and for storing said updated information in said consumer memory.

6. The computer-based communication system of claim 1, wherein said control structure includes notification metadata, said notification metadata including associations that are processed to control notifying a user of at least portions of the updated information; and wherein the system further comprises notification control means including:
(a) instruction retrieval means for retrieving notification instructions associated with said associated portion of said updated information in said consumer memory based upon the process defined by the control structure;
(b) instruction execution means for executing said notification instructions to notify the user of said updated information.

7. The computer-based communication system of claim 6, wherein said notification metadata includes a plurality of information references, each information reference being associated with a portion of the updated information; and wherein said instruction execution means includes:
(a) user preference means for receiving at least one user reference,
(b) preference comparison means for comparing said plurality of information references to said at least one user reference, and
(c) reference notification means for notifying the user of portions of the updated information associated with information references which correspond to said at least one user reference.

8. The computer-based communication system of claim 1, wherein the control structure includes response control information for defining a second process for controlling a transfer of a copy of consumer information stored in the consumer memory to a communications network address specified by said response control information; and the system further comprising:
consumer transfer means, associated with the consumer memory, for processing the response control information to transfer said copy of said consumer information to the communications address.

9. The computer-based communication system of claim 8, wherein the communications address is associated with the provider memory, and the system further comprising:
reception means, associated with the provider memory, for receiving the consumer information from the communications address and storing it in the provider memory based upon the second process defined by the response control information.

10. The computer-based communication system of claim 8, further comprising:
consumer request means, associated with the consumer memory, for requesting the consumer information from a user based upon the second process defined by the response control information; and
consumer input means for receiving the consumer information input by a user and storing said information in the consumer memory.

11. The computer-based communication system of claim 8, further comprising:
update determining means for determining when consumer information in said consumer memory has been updated based upon the process defined by the control structure; and
instruction execution means for processing said response control information to transfer a copy of said consumer information which has been updated from said consumer memory to said communications address.

12. The computer-based communication system of claim 4, wherein control structure includes response control information defining a second process for controlling a transfer of consumer information stored in the consumer memory to the provider memory; and the system further comprising:
consumer tranfer means, associated with the consumer memory, for tranferring a copy of said consumer information to the provider memory based upon the second process defined by the response control information; and
wherein said association means associates portions of said information is said provider memory with said consumer memory based upon siad consumer information.

13. The computer-based communication system of claim 1, wherein said provider memory operates as a web server and said consumer memory operates as a client of said web server.

14. The computer-based communication system of claim 1, wherein said information includes instructions, and said metadata includes associations with at least said instructions.

15. The computer-based communication system of claim 1, wherein said metadata includes associations with said control structure.

16. The computer-based communication system of claim 1, wherein said associations include hypertext links.

17. The computer-based communication system of claim 1, wherein said control structure is embodied as a MIME object when transferred.

18. The computer-based communication system of claim 1, wherein said control structure is stored in a portion of the provider memory at a communications server separate from a portion of the provider memory storing other of said information.

19. A computer-based method for communicating updated information comprising the steps of:
creating metadata defining a control structure in a provider memory, said control structure including associations with portions of said information in a provider memory, said control structure defining a process to transfer an associated portion of said information associated with said control structure to a consumer memory; and
transferring a copy of the associated portion of said information, and said control structure, from the provider memory to the consumer memory; and
determining when the associated portion of said information in said provider memory has been updated based upon processing of said control structure; and
processing said information, including said control structure at least at said consumer memory, to transfer a copy of said associated portion of said information from said provider memory to said consumer memory when the associated portion of information in said provider memory has been determined to have been updated.

20. The computer-based method of claim 19, wherein said control structure includes notification metadata representing a process for notifying a user of at least portions of the updated information; and the method further comprising the step of processing said notification metadata to notify the user of said at least portions of the updated information.

21. The computer-based method of claim 20, further comprising the steps of:

setting user preferences representing types of information for which a user is to be notified of updated information;

comparing updated information with said user preferences; and notifying the user of updated information based upon the comparing step.

22. The computer-based communication method of claim 19, wherein the control structure further includes response control information, including a communications network address, for transferring a copy of consumer information stored in said consumer memory; and the method further comprises the step of:

processing said response control information to transfer a copy of said consumer information from said consumer memory to said communications network address.

23. The computer-based communication method of claim 22, wherein the communications network address is associated with the provider memory; and the method further comprises the steps of:

processing said response control information to transfer said consumer information from said communications address to said provider memory; and receiving and storing the consumer information in the provider memory.

24. The computer-based communication method of claim 22, wherein said processing step includes:

requesting consumer information from a user; and receiving consumer information input by a user;

storing said consumer information in the consumer memory, and transferring a copy of said consumer information to said communications network address.

* * * * *